US006741974B1

(12) United States Patent
Harrison et al.

(10) Patent No.: US 6,741,974 B1
(45) Date of Patent: May 25, 2004

(54) GENETICALLY PROGRAMMED LEARNING CLASSIFIER SYSTEM FOR COMPLEX ADAPTIVE SYSTEM PROCESSING WITH AGENT-BASED ARCHITECTURE

(75) Inventors: Gregory A. Harrison, Orlando, FL (US); Keith Hollister, Orlando, FL (US); Eric Worden, Orlando, FL (US)

(73) Assignee: Lockheed Martin Corporation, Orlando, FL (US)

( * ) Notice: Subject to any disclaimer, the term of this patent is extended or adjusted under 35 U.S.C. 154(b) by 350 days.

(21) Appl. No.: 09/586,456

(22) Filed: Jun. 2, 2000

(51) Int. Cl.$^7$ .......................... G06F 15/18; G06F 17/00
(52) U.S. Cl. ............................ 706/47; 706/13; 706/14
(58) Field of Search .............................. 706/47, 14, 13

(56) References Cited

U.S. PATENT DOCUMENTS

| | | | |
|---|---|---|---|
| 4,697,242 A | 9/1987 | Holland et al. | 706/13 |
| 4,821,333 A | 4/1989 | Gillies | 382/308 |
| 4,881,178 A | 11/1989 | Holland et al. | 706/12 |
| 4,935,877 A | 6/1990 | Koza | 706/13 |
| 5,136,686 A | 8/1992 | Koza | 706/13 |
| 5,148,513 A | 9/1992 | Koza et al. | 706/13 |
| 5,222,192 A | 6/1993 | Shaefer | 706/13 |
| 5,343,554 A | 8/1994 | Koza et al. | 706/13 |
| 5,390,282 A | 2/1995 | Koza et al. | 706/13 |
| 5,394,509 A | 2/1995 | Winston | 706/13 |
| 5,742,738 A | 4/1998 | Koza et al. | 706/13 |
| 5,781,698 A | 7/1998 | Teller et al. | 706/13 |
| 6,073,142 A | * 6/2000 | Geiger et al. | 715/500 |
| 6,076,099 A | * 6/2000 | Chen et al. | 709/202 |

OTHER PUBLICATIONS

McAulay et al, "Improving Learning of Genetic Rule–Based Classifier System", IEEE Transactions on System, Man and Cybernetics, Jan. 1994.*

Pozo et al, "A Genetic Classifier Tool", IEEE International Conference of the Chilean Computer Science Society, Nov. 2000.*

Robert A. Richards, "Classifer System and Genetic Algorithm", http://www.stanford.edu/~buc.sphincsx/book.html, 1995.*

D.E. Goldberg, 1989, Genetic Algorithms in Search, Optimization & Machine Learning, Addison–Wesley, Reading, MA.

J.R. Holland, 1995, Adaptation in Natural and Artificial Systems, The MIT Press, Cambridge, MA.

M. Dorigo, 1991, Message–Based Bucket Brigade: an algorithm for the apportionment of credit problem, Proceedings of European Working Session on Learning '91, Porto, Portugal, Y. Kodratoff (Ed.).

R. Richards, 1995, Zeroth–Order Shape Optimization Utilizing A Learning Classifier System.

D.B. Lange and M. Oshima, 1998, Programming and Deploying Java Mobile Agents with Aglets, Addison–Wesley, Reading, MA.

Manu Ahluwalia and Larry Bull, Jul. 1999, A Genetic Programming–based Classifier System, Genetic Algorithms and Classifier Systems, pp. 11–18.

K. Hollister, G. Harrison, E. Worden, Dec. 1998, Intelligent Agent Technology, Lockheed Martin Proprietary Data DOC A—Distributed In Confidence to 3rd Parties.

K. Hollister, G. Harrison, E. Worden, Dec. 1998, Intelligent Agent System, Lockheed Martin Proprietary Data DOC B—Shown in Confidence to 3rd Parties.

* cited by examiner

Primary Examiner—George B. Davis
(74) Attorney, Agent, or Firm—Welsh & Katz, Ltd.

(57) ABSTRACT

A system and a method enabling a software agent to learn about its environment, and learn how to perform jobs and tasks. Novel information is assimilated and used in an adaptive manner by the genetically evolving rule set of the agent. The agent learning system communicates with the external environment in an artificial economy through on-line auctions. Internal information also passes through message auctions, that provide chaining of rule execution. The agent continually attempts to automatically improve its performance with respect to fitness for a job.

81 Claims, 20 Drawing Sheets

FULLY DIMENSIONED GENE GRAPH

GENETICALLY PROGRAMMED LEARNING CLASSIFIER SYSTEM FOR COMPLEX ADAPTIVE SYSTEM PROCESSING WITH AGENT-BASED ARCHITECTURE

FIELD OF THE INVENTION

The invention pertains to systems and methods that incorporate machine learning and automatic adaptation to respond to changing environmental conditions. More particularly, the invention pertains to such systems and methods that incorporate genetic algorithms, learning classifier systems and agent technology in the realization of a complex adaptive system.

BACKGROUND OF THE INVENTION

Information systems have grown to comprise such a large number of subsystems that direct centralized control is often very difficult, if not impossible. In actual use, the systems change, new situations develop in the system environment, various new components are added, and the relationships between existing components may change. This is typical of a real-world system, and such a system is called a complex adaptive system, or CAS.

Structured and object-oriented software techniques provide many useful paradigms for software development in a CAS. However, agent-based systems are superior in that system intelligence is contained in locally encapsulated software entities, or agents, and is thus portable and dedicated to given tasks. Individual agents can adapt without changing the rest of the system. An agent is a self-contained entity in a CAS. Each agent is able to accomplish given tasks within a software environment.

The use of multiple agents allows interaction and parallel execution of multiple tasks in diverse locations throughout the system. The intrinsic parallelism provides enhanced system robustness.

Because a CAS is continually changing, it is necessary to provide the agents with a form of learning, to allow them to adapt on-line to the changing environment. Using the principles of evolution, the agents can learn to accomplish their tasks, and continually work to improve their performance, and hence their fitness, to better survive in the current environment. Various solutions are built and tested, and the better solutions are kept and combined with other good solutions to attempt to continually improve the performance.

One known approach, a learning classifier-system, was a machine-learning technology that attempted to learn optimum job performance in a given environment. This was a rule-based system containing multiple rules, and was capable of generating new rules as needed. This type of system was capable of creating rule-chains, by allowing time-delayed rewards to influence the fitness of earlier rules in the chain, and by passing part of the reward earlier in the chain. It incorporated a genetic algorithm, to create new rules, and to evolve the existing rules through rule crossover and mutation techniques.

The rules contained in the known system consisted of fixed-length strings of binary digits, requiring external interpretation to express their meaning. Through the use of binary digits, with the addition of a wild card symbol, hierarchies of rules could be evolved, where one rule could be applicable in multiple situations. Because the known system was constrained to operate on binary strings, it was difficult to add new information into the system. The interpretation of each of the binary digits in the string would have to be modified to accommodate the new information, and the string length would change, all increasing complexity.

Genetic programming evolved to create more text-based evolved solutions to problems. Instead of using a binary string, genetic programming combined functions and terminals, which are represented by words, into a string that is genetically evolved. The functions and terminals can be combined in a type of Lisp or tree expression. As known, genetic programming determines only a single solution from the evolutionary process. In contrast, learning classifier systems need multiple actions to be maintained in the knowledge base.

Thus, there is a need to combine properties of learning classifier systems and genetic programming to create an adaptable system that automatically learns optimum behavior. Preferably such a system would use the terms and operations of the actual environment to make up its rules, while maintaining a diverse rule base.

It would be preferred if it would be unnecessary to code software manually based on learned information. Preferably, such systems would incorporate online adaptation and response to environmental changes. Such adaptation would minimize down time or sub-optimal functioning while awaiting new software.

It would also be preferred if manual software changes would be unnecessary to modify system behavior or to respond to changes in the environment or the system being controlled. In this regard, distributed processing as opposed to centralized control minimizes problems due to losses of portions of the system resident at remote nodes. It would also be preferable if it would be unnecessary to have a human maintain and update the software manually. This avoids ongoing needs to understand the software, modify tests and integrate the modified software.

SUMMARY OF THE INVENTION

A system which embodies this invention enables a plurality of intelligent agents to learn to accomplish tasks in their environment and to adapt to changes in the environment. The agents each have a substantially similar structure and incorporate a plurality of pre-stored rules.

Each rule has an associated fitness or success measure. This measure can be dynamically increased and decreased in response to effectiveness in carrying out a function.

Agents incorporate an internal message list. This list can be accessed by the rules. The messages can be allocated by, for example, an auction process.

Agents also have access to an external message list at each site. Messages are received and auctioned to the agent population. Funds are collected from successful bidders and distributed, at least in part, to the agent or agents which contributed the auctioned messages.

In one embodiment, the intelligent agents exist in an artificial economy where information is bought and sold. The fitness of agents for a certain task is based upon virtual funds they have accumulated over time.

The funds a certain agent possesses are related to how well it performed jobs that is has attempted. Rewards are provided in an ongoing manner as jobs progress, allowing an agent to learn which actions to take to accomplish each job.

Agents that perform the jobs correctly and efficiently are rewarded more than agents that do not. Agents that accumulate more funds or fitness indicia are used to populate the environment, through cloning, and evolutionary techniques such as simulated sexual reproduction. In this simulation process, new agents are created from two parent agents with the parent agents being selected by their level of fitness.

In another embodiment, the environment can contain multiple sites where agents can execute their commands, communicate with other agents, and interface to the outside world. Each site is a location on a computer that supports the existence and operation of agents. The site contains message boards that are available for use by the agents. A site serves as an address for agents to be used when agents traverse the network.

Sites are interconnected, such that agents can be dispatched from one site, traverse the network, and reappear at another site. Sites may be located on the same computer, or distributed geographically to distant locations connected through a digital communications system. The conglomeration of all sites and agents that exist at those sites is called the environment.

Sites can contain an interface agent that provides a vehicle for agents to communicate with software systems that are external to the agent site. These external software systems may consist of databases, messaging/communication systems for human users, or other pre-existing software applications.

Instead of using binary strings, in another aspect, strings of high-level computer language words that are sequenced under syntax rules and structured in the form of IF-THEN statements. Irrespective of language, the present rules have a two part structure wherein antecedents must be satisfied before any consequent can result.

In another embodiment, software is combined, using simulated genetic crossover and mutation operations, into the structure of a rule or rules. These rules can be combined into a population of rules. The best performing rules are combined to make new rules. The use of high-level rules allows easy insertion of new information to the system. In addition, it removes the need to interpret the bits in a binary string in order to execute the program.

In yet another aspect of the invention, a method is provided for covering messages that were on a message board but not acquired. New rules can be created which contain new information from the environment. In yet another embodiment, genetic code can be modified by adding new functions into antecedents and consequents.

A FEHN array can be used to determine the structural and functional closeness between chromosomes. Hence, a new rule can be compared to an existing rule by comparing the FEHN array representative of their gene graphs. Crowding can be used to select a rule of lesser effectiveness for replacement while maintaining diversity.

An apparatus which embodies the present invention automatically learns how to control a system and performs continual optimization of the control of that system or process. Exemplary control systems include machinery, electronics, software interfaces, as well as processes of all types. Control sequences and settings for the system operation are automatically defined.

In another aspect of the invention, starting from a set of software primitives, a program that implements certain desired functions in the particular application can be constructed, tested and maintained. The automatic learning capability of the present invention facilitates learning how to most appropriately control a respective system and how to change internally to respond to changes in the environment.

In yet another aspect of the invention, online adaptation makes it possible to attempt to adapt to changes in the environment, the controlled system, over a period of time.

In software implemented embodiments, new software is automatically constructed to perform a required job or carry out a function using software function calls and appropriate data associated with the respective subject matter domain. New elements which are injected into the domain are automatically incorporated into the solution.

Another advantage of control systems which embody the present invention is that they are more recoverable and survivable in view of the fact that the agents are distributed throughout the network and can travel between sites. If one site gets isolated from the rest of the network local agents at the isolated site can develop capabilities to perform needed local processing. Agents capabilities that may have been lost when the site went down can then be automatically re-established by the learning system by growing new agents programs.

Other advantages grow out of self-maintainability. Control systems which embody the present invention continually monitor their performance in relation to a task. They continually try to improve their performance. If new information becomes available, it can be automatically incorporated. If a performance dip occurs, one of the advantages of the present invention is that the respective control system will try other avenues of system operation to attempt to increase performance.

The present system has the further advantage of performing continual optimization. Even after a satisfactory performance level has been reached, the system will continue to try other approaches to accomplish a required job. As newer and/or better solutions become available they will automatically be implements. Such improvements include reduced costs, processing time or network usage.

Another advantage of an embodiment of the present invention grows out of the fact that such embodiments perform genetic evolution using software syntax words instead of digital data bit strings. As a result, the present invention can be more easily applied to a given problem. An implementer does not need to translate information from the problem domain into coded bits. Instead, software functions and data that exist can be directly used. Maintenance is facilitated because there are no bit strings which have to be changed with associated coding or decoding. Additional information can be automatically added using an extensible, tree-based data structure.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
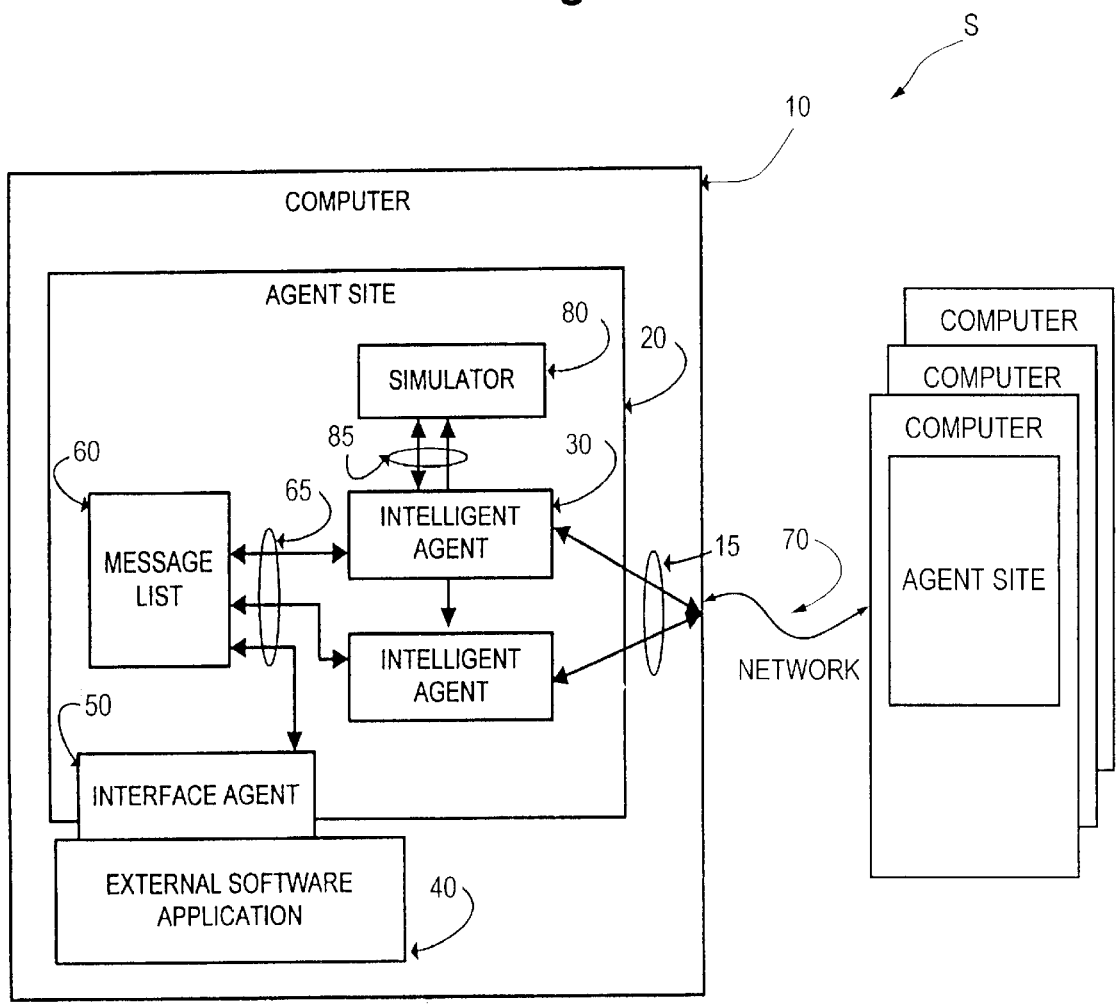
FIG. 1 is a top-level illustration of a system that hosts intelligent agents constructed in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

A top-level view of a system S, a plurality of computers 10, is illustrated in FIG. 1. Many types of computers can be used in this system, including those running Unix, or Windows operating systems. The software in a preferred embodiment will be written entirely in Java. Hence, it should be executable on any system that supports Java and has sufficient resources to support the agent learning system.

The computers may be embedded, such as in an aircraft or tank. Alternately, they may be desktop systems, server systems, or laptops. There is no requirement for a human-readable display or input device, although these devices would allow a human user to interact with the system, and are supported.

The system S establishes a virtual world or society inside of the networked computer systems. This virtual world supports the operation and reproduction of mobile, autonomous, software agents.

The computers can be distributed throughout a digital communications system, 70. In one embodiment, this network includes an intranet running TCP/IP.

While the present agent learning system is executable on a single computer, the networked embodiment uses a distributed system to allow intelligent agents 30 to traverse the network. The mobility feature of these intelligent agents allows them to reach remote resources and operate a larger system than may be present on a single computer. This mobility also reduces the need to fuse all required resources into a single representation on a single computer, which may be hard to maintain. The agents learn the correct computers to visit to interact with the correct distributed resources to perform their jobs in the most fit and efficient manner.

At least one agent site 20 is supported on each computer in the plurality. The agent site 20 is preferably implemented as a software process that enables agents to execute their code at a respective computer. It provides agent intercommunication and administration and allows the agents to execute as parallel execution threads on a single computer.

Multiple sites can be supported and run on a single computer. Alternately, the sites could be located on distributed computers, perhaps at great geographical distances from each other.

When an agent moves from one site to another, the agent temporarily ceases execution of its program. The site then packages the object code of the agent into an entity which can be transmitted using the protocols and computer-network connection-support software 15, and sent via the network to the remote site. The remote site then reassembles the object code into an executable agent and starts the agent executing from where it left off.

A computer in the environment may also host other external software applications 40 such as a database, voice production software, motor driver, sensor fusion bank, computerized maintenance management system, radar, sonar, alarm system monitor, machinery control system state monitor, or health monitoring systems.

An interface agent 50 translates information between the external software application and the agent site.

A message list 60 is accessible 65 from all agents in the system. It accepts messages from various agents and auctions these messages off to the agent population.

The message list acts as a clearinghouse. It collects payment from agents that purchased a message and distributes payments to agents that posted the purchased messages. Learning and operation of the agents are substantially controlled by an artificial economy and virtual funds.

A simulator 80 can be incorporated into the site 20 to enhance learning operations. Because machine learning requires many trials to learn a task, the simulator 80 relieves the system from the burden of having multiple agents issue repetitive queries on interfaces or dispatching repetitively to different sites throughout the environment.

Without a simulator, the network could be burdened by the learning process. As a result, the system S would learn relatively slowly because all the latencies associated with network travel and interfacing to external applications would be included in the many trials that an agent learning system must execute in order to learn the task.

The simulator 80 provides a dynamically updated replica of the environment that statistically models the results provided from various external resource applications. The agent enters the simulator regularly 85, both to learn new jobs and to continually train and refine its capabilities. For instance if an agent learned to perform job A, but the environment changed such that a particular step of job A no longer causes the correct response, this information would be reflected in the simulation. The fitness of the agent would drop due to lack of a correct response, thus causing the agent to enter simulator 80 to attempt to determine how to perform the job successfully again.

Figure 2:
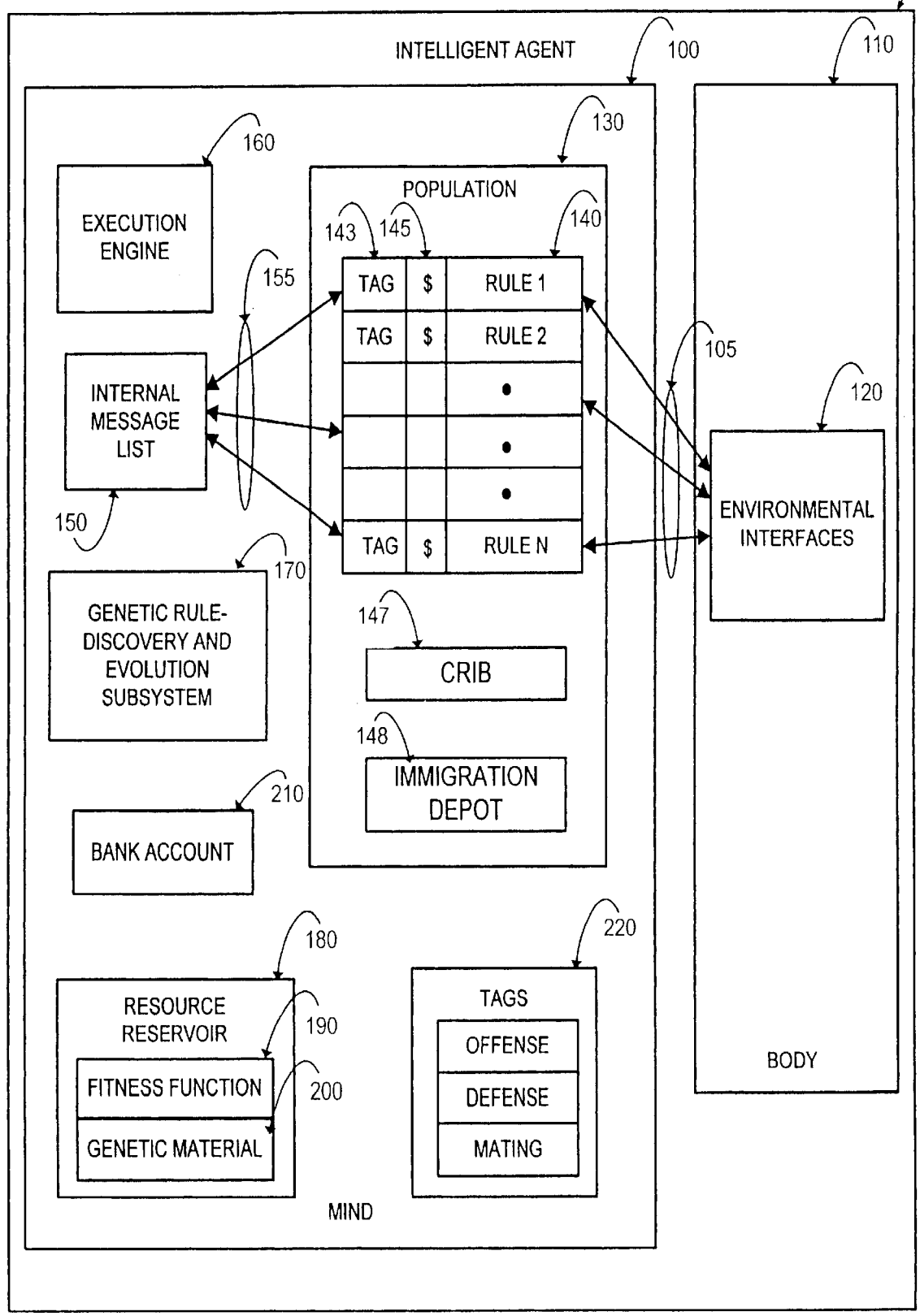
FIG. 2 illustrates the internal structure of an intelligent agent of the type usable in the system of FIG. 1.

The internal architecture of an agent 30 in accordance with this invention is illustrated in FIG. 2. For descriptive purposes, the agent 30 is split into a virtual mind 100 and a virtual body 110.

The virtual mind 100 is the essential intelligence that allows the agent to learn, retain information, and determine actions. The body 110 is the container for the mind, and provides the capability to execute commands that the mind has issued, and to provide information from the outside world to the mind.

The outside-world information is obtained through environmental interfaces 120. Such interfaces include, for example, external message board links, mobility controls and reward acceptors. During high-speed training, the mind will leave the agent body, and will be linked with a different body in the simulator 80. The simulator body supplies the mind 100 with the same inputs and outputs as the real-world body 110, but executes in the simulator, for increased speed and repetitive training. Using interfaces, the mind 100 is connected 105 to the correct body for either simulated or actual system usage.

The agent 30 includes a population 130 of rules 140. The term 'rule' will be used interchangeably with 'individual'. The term population is also interchangeable with 'knowledge base'. There are multiple computer generated rules. Rules can also be written by hand, but this is not required.

The rule base is continually exercised by an execution engine 160. Engine 160 tests the rules to see which ones should be active, allows the rules to purchase and sell information, and permits the rules to execute their code if they become activated.

Although the agent 30 can be viewed as a single entity in the environment, each rule in the population is viewed as an individual with respect to the agent. It is as if the population was a small town and the individuals populate it.

Using a genetic rule-discovery and evolution subsystem 170, the virtual population evolves in a process analogous to a struggle for survival of the fittest in accordance with a predetermined figure of merit. The fitness selection process promotes the development of effective individuals while the less effective individuals drop out.

Unlike genetic programming or genetic algorithms, where a single best individual is evolved, the whole population of an agent is treated as a community of individuals. In the system S, there is not just a single best individual that is supposed to solve a problem Instead there is a group of individuals that depend on each other for correct sequencing of the problem solution and for handling portions of the solution for various problems. For this reason, special steps are taken to ensure diversity in the population, and to avoid the blind eradication of individual rules, that appear less fit without considering their purpose in the society.

New individuals are created through simulated, virtual mating of two individuals in the population, or through mutation of a single individual in the population. The parents are chosen through algorithms that help preserve diversity, while still favoring the more effective individuals. These individuals are combined, in a manner to be described, and a child offspring is created.

The child is stored in the crib 147 until the existing adult individuals are done mating. The children are then integrated into the population one-by-one, by eliminating the least effective individual that is closest in structure to the new child, and putting the child in their spot. Migrants and mutants are handled in a similar way.

Migrants are individuals, or rules, that arrive from other agents. Mutants are created by cloning an individual and installing some random changes in the individual's genetic makeup. These are generally chosen from other agents as being highly fit individuals or families of individuals that are cloned and sent to other agents, thus distributing intelligence throughout the system. Incoming migrants are stored in the immigrant depot 148. They are integrated into the population in the same manner that children are integrated.

Individual rules have tags 143 that indicate the jobs with which the rule is associated. As agents learn jobs, the rules that fire in the process of performing the job get tagged 143 as being part of performing that job. This allows for more detailed and controlled evolution, as well as for knowledge sharing between agents with respect to given jobs.

Individual rules in the population have their own performance indicia, or, virtual funds kept in wallets 145. These funds are used for many purposes in the system. They can be used to buy information from the message boards. Funds are increased when payments are received from other individuals for messages they purchased. They serve as a measure of the relative usefulness of this individual to the society. They are increased or decreased when rewards or punishments are received during the process of learning a job. The systems also maintains a bank account 210 for the purpose of making internal reward payments.

The agent contains an internal message list 150 that is accessed 155 by the rules in the population to buy and sell information between each other. Like the external message list, or EML, the internal message list, IML, auctions the messages to the highest bidder. In this case the bidder comes from the population of rules, not the higher-level population of agents.

Rules check the message list to see if they need any of the messages on the list in order to execute. If so, the rule places a bid on that message.

If the rule is the high bidder, it wins that message, and can proceed to try to execute the rest of its program. If the rule can execute, it will subsequently place a message on the internal list 150 or external message board 60 when it is done. Another rule may buy the message, thus passing performance indicia, virtual funds, from one rule to another. If one rule later on down the chain of rule executions gets rewarded for satisfying some milestone, then the rewarded rule can pay more next time for the information. Thus rule chains, also called families, or job chains, which lead to a reward tend to get strengthened, and thus win more bids. As a result, the more effective rules execute more.

When rules bid on messages, they have to pay a bid tax, whether or not they succeed in winning the message. All rules are also periodically taxed a life tax. Between the bid tax and the life tax, rules that accomplish little or nothing will eventually be selected for elimination from society, being replace by new children or migrants.

Tags 220 are used to help to indicate that the agent is suited for particular tasks. The offense tags indicate what the agent is good at; the defense tags serve to protect the rule by indicating what strengths it has in certain areas, such as with respect to a certain job; and the mating tags segregate the agents when selective, virtual breeding is performed. Tags are updated as the agent learns different jobs.

Classifications of different job types are also associated with a figure of merit indicating this agent's ability to perform in this capacity. As training increases, or actual job performance ensues, the figure of merit will be updated to indicate higher fitness. For example, if it is desired to develop agents that can automatically order engine parts, then these agents would likely be better mated with other agents that get high scores in connection with ordering parts.

Tag-driven selectivity also applies when it comes to obtaining jobs to execute. Agents can bid higher on jobs for which they have good performance ratings and compatible tags, and will thus be more likely to win the job. In this way the fitness of the overall system increases.

The agent maintains a resource reservoir 180 that holds essential data items, which may be dynamic to some extent. The fitness function(s) 190 provide the agent with a reference as to how well it is performing the various jobs that it is either learning or executing. The fitness function(s) is used to help decide between different courses of action. For example, actions will be chosen that yield a greater degree of fitness, expressed as monetary rewards given to individual rules when they have succeeded in accomplishing milestones that are monitored by the fitness function. Each job has its own fitness function.

The resource reservoir also contains raw genetic material 200 for use in constructing new individuals. In the illustrative embodiment, each rule individual contains a simulated chromosome, made up of program elements that can be moved and recombined under certain restrictions to make new programs.

The raw genetic material includes functions and terminals that may be combined into chromosomes. A function can accept other functions or terminals as arguments, but a terminal takes no arguments.

The illustrative embodiment uses strong typing, so that only certain functions or terminals may be used as inputs to a given function. The input functions and terminals must satisfy a type constraint, such that they must return a result of a certain data type when they execute. Also, functions require that their arguments be of certain types. The automatic program generator then makes programs up by random by matching input and output types.

New raw genetic material may take the form of new terminals, such as "Generator 8" or "Inventory Site B". As the system becomes aware of new terminals, they become added to the resource reservoir for use in automatically creating and testing new programs. Other raw genetic material may take the form of functions, such as "SetGoal (string)", "increaseSpeed(Generator)", or "Dispatch(site)".

The function "SetGoal (string)" accepts a string as an input argument, and returns a certain data-type answer, such as a Boolean (true/false) value, when complete. The "Dispatch(site)" function accepts a site argument, which can be a terminal of type site, or a function that returns a site, and when the agent has dispatched to the site, it may return a Boolean true or false to indicate the success or completion of the operation.

Figure 3:
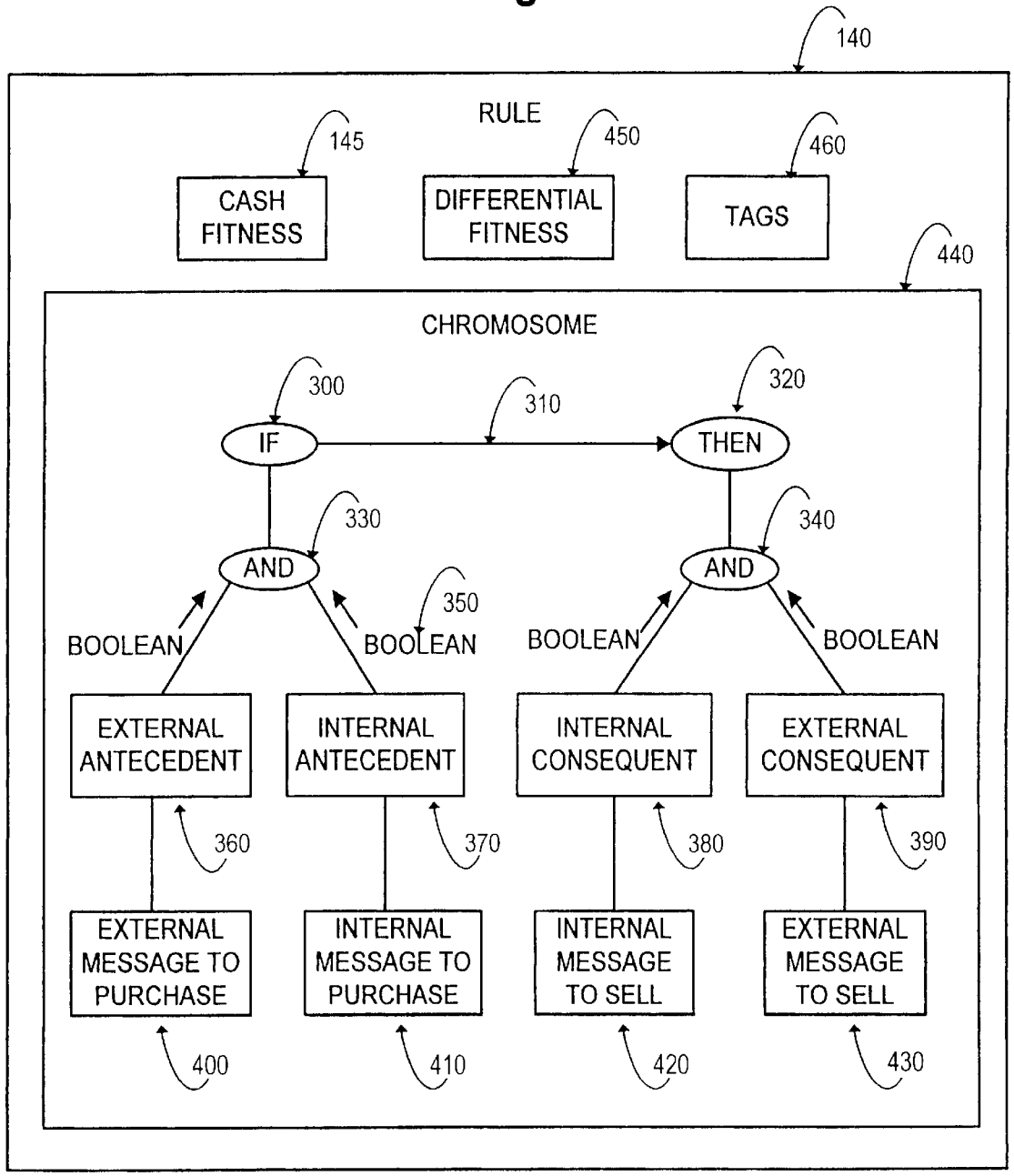
FIG. 3 illustrates the structure of a rule that is part of the rule list of an intelligent agent.

Each rule 140 in the population of rules in the agent substantially has the form illustrated in FIG. 3. The rule 140 has a fitness wallet 145 that acts as a wallet for holding the resources, illustrated as a synthetic currency, that a rule possesses. This fitness wallet is the source of resources to pay bids on messages that are purchased, bid tax, life tax, and punishments issued from the reinforcement controller. The fitness wallet also accepts resource payments directed to the rule from other rules that had acquired or bought this rule's message, or from rewards that are received from a reinforcement controller.

Differential fitness 450 is a memory that stores only the rewards and punishments received since a job was begun. It is reset each time a job is started. The summing of the differential fitnesses of each rule provides a total differential fitness grade for the agent with respect to performance on a given job.

Differential fitness thus serves as a way to grade the agent with respect to job performance, and without dependence on the degree of resources that the agent has. This takes into account a new agent that may have been just evolved and entered the agent pool with superior job performance, but has not as yet accumulated resources to the extent as other agents. Thus the ability to grade agents based solely on job performance even without extensive history, allows the new solution to be recognized as superior.

The rule's tags 460 include a table that is loaded with a representation of a job when the rule is executed in the conduct of that job. Hence the rule will be tagged as belonging to the set of rules that are used on that job. This functionality becomes important when the set of rules is extracted from the agent, or when it is mated with the sets of rules from this population or the population of other agents having performed the same job.

Each rule contains a chromosome 440. The chromosome is an IF-THEN statement having a specific structure, but also having portions constructed automatically using genetic techniques.

The chromosome contains an IF section 300, also termed the antecedent. The IF section contains of an Internal Antecedent 370 and an External Antecedent 360. These are ANDed 330 together to produce the entire IF portion of the chromosome.

The Internal and the External Antecedents are both generated automatically using genetic techniques, and consist of software programs constructed of functions and terminals. The execution of the External or Internal Antecedent software code produces a respective Boolean output 350 of TRUE if the state of the external or internal environment is such that the program in the antecedent can successfully execute.

The External Antecedent may have automatically been written so that it will try to purchase or acquire an External Message from the external message list. In this case the External Antecedent will contain a primitive that specifies the External Message to Purchase 400.

The Internal Antecedent may specify an Internal Message to Purchase 410 from the Internal Message List. Between both the internal and the external side of the antecedent, the rules must purchase at least one message. If the IF section of the rule evaluates to TRUE, then the THEN side of the rule is allowed to execute 310.

The Consequent or THEN side 320 of the rule also contains two parts. These are the Internal Consequent 380 and the External Consequent 390.

The Internal Consequent may contain an Internal Message to Sell 420 on the internal message board. The External Consequent may contain an External Message to Sell 430 on the external message board. There must be at least one message to sell, either internally or externally. The Internal and the External Consequents are ANDed together 340 to indicate that they both are to be executed.

The rule structure of FIG. 3 is present in every rule, and does not change from rule to rule. The internal structure of the antecedents and consequents does change.

Figure 4:
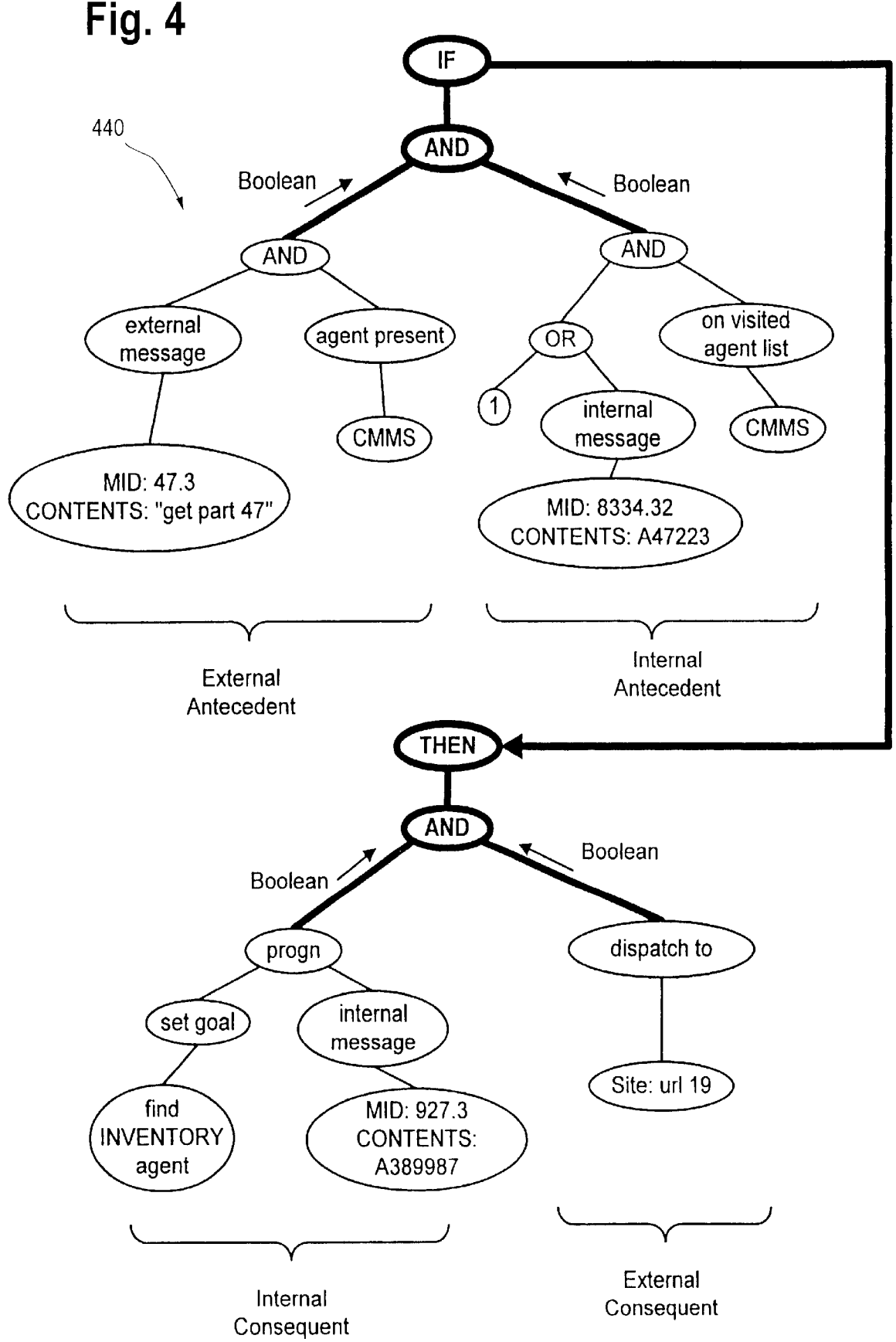
FIG. 4 illustrates a detailed example of a genetically generated rule in the agent which adheres to the overall structure of the chromosome of FIG. 3.

A more detailed view of the chromosome 440 is illustrated in FIG. 4, where an example of the internal structure of the antecedents and consequents are shown. The portions that are not changeable are illustrated in the thicker line width. The changeable, or evolvable portions are illustrated in the thinner line width.

Figure 5:
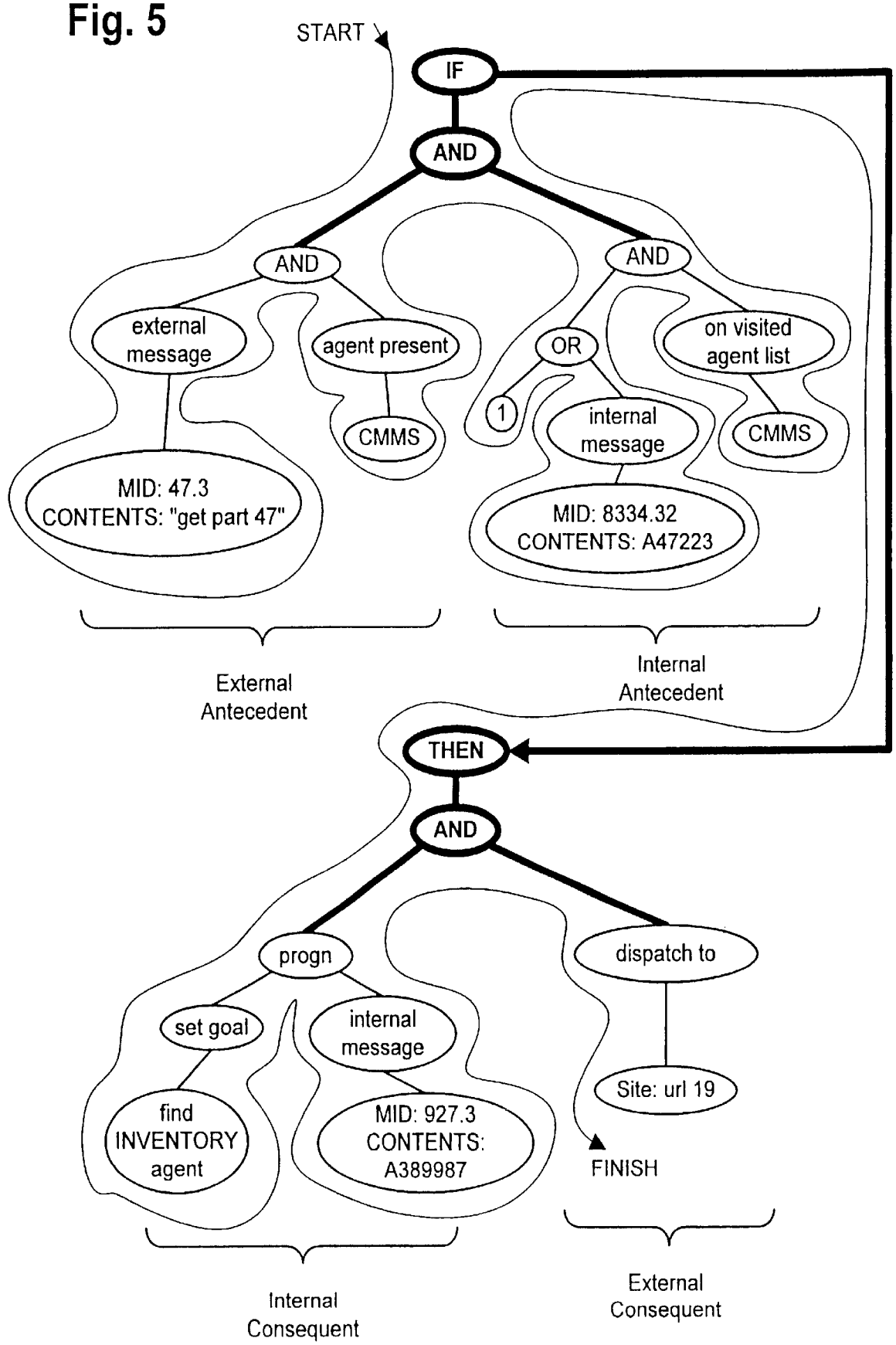
FIG. 5 illustrates the evaluation path for the detailed rule of FIG. 4.

FIG. 5 illustrates the execution path followed when executing the rule of FIG. 4. The rule thus acts as an ordered tree structure that is traversed using a depth-first preorder method, where the root is executed, then the execution proceeds left to right. The rule would thus be interpreted as:

```
IF (
    AND (
        AND (
            external-message( CONTENTS:"get part 47")
            agent-present( "CMMS" )
        ) AND (
            OR (
                1
                internal-message( CONTENTS:"A47223")
            )
            on-visited-agent-list( "CMMS")
        )
    )
) THEN (
    AND (
        progn (
            set-goal( "find INVENTORY agent")
            internal-message( CONTENTS:"A389987")
        )
        dispatch-to( "Site: url 19" )
    )
)
```

In the execution of a rule in accordance herewith, the processing stops as soon as the IF part of the rule fails to return a TRUE output. The "progn" word in the internal consequent of the rule signifies a function that just serves to execute 'n' items, or program steps, in order, and has been set to execute two items in this example.

The internal-message and external-message primitives operate differently, depending on whether they are in the antecedent (IF) or the consequent (THEN). If they are in the antecedent, encountering the message during rule execution requires that the agent try to bid and win the message from the message list, if the message exists on the message list. If the message appears in the consequent, then the agent places that message on the appropriate message list: The agent maintains a list of what messages it needs to buy for each rule, so it can pre-process them quickly.

Figure 6:
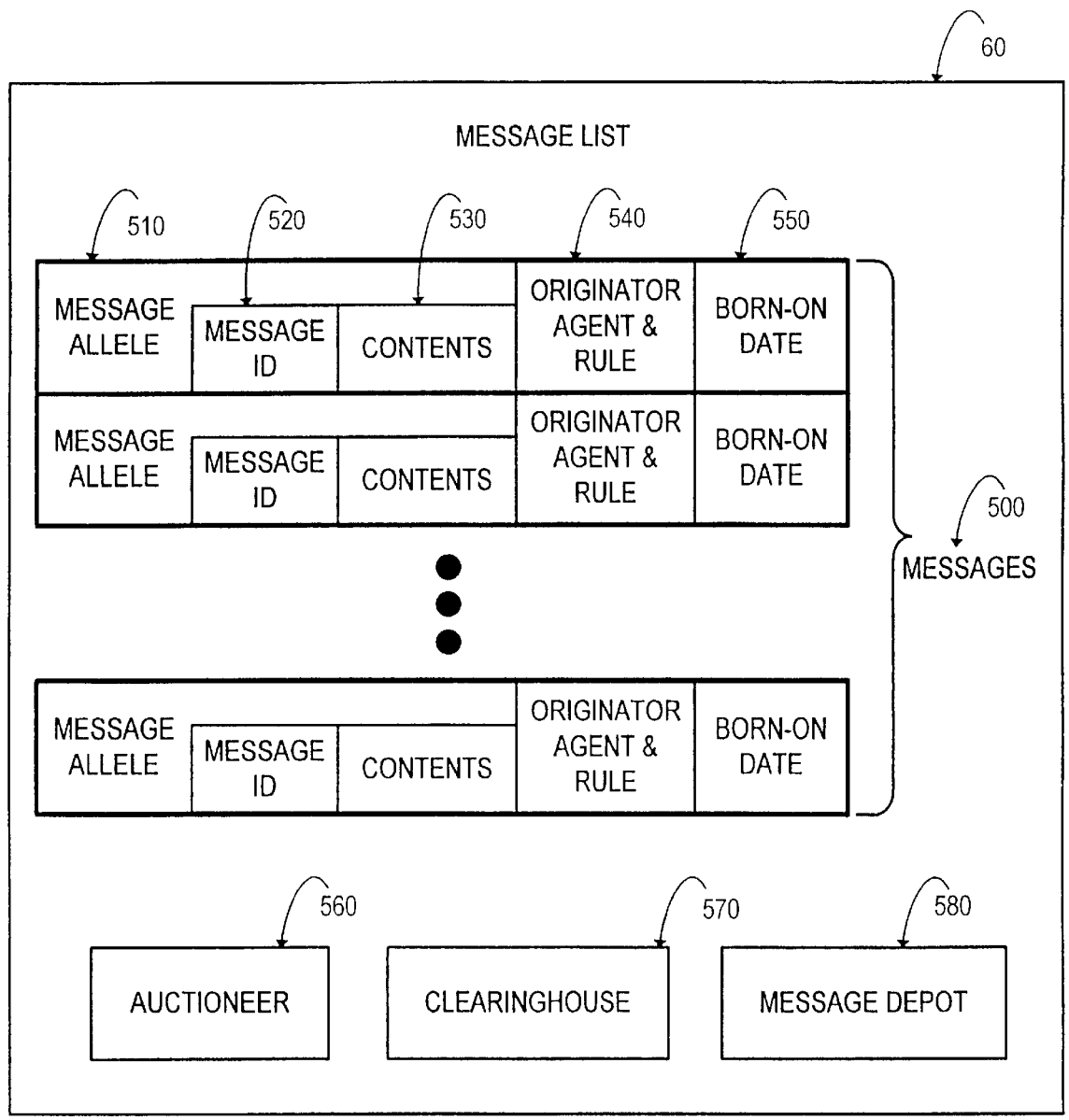
FIG. 6 illustrates the components of a message list, as well as the structure of a message.

The message list 60, illustrated in FIG. 6, is the primary internal and external communications unit for the agent system. The message list contains a dynamic group of messages 500. These messages are placed onto the list by an agent or rule, and remain on the list until they are purchased, or for a certain duration otherwise.

Each message contains a Message Allele 510 that expresses the substance of the message, describes its Contents 530, and identifies the contents with a Message ID Number 520. The message contains the identification of the Originator Agent and Rule 540, so that the agent that put the message on the rule list can get compensated when the message is purchased. The Rule ID is also supplied so that the correct rule of the originating agent can receive the payment. The message also includes a Born-On Date 550 for use in age determination and operation with algorithms to process old un-bought messages.

The message list Auctioneer 560 controls all purchases of messages from a message list. While a given message is available for auction, rules can place bids on the message. The Auctioneer accumulates bids for each message. The auction is a sealed-bid English auction, where the highest bidder wins, and no competitor sees the bid of any other competitor.

When the auction closes, the Auctioneer informs the winning rule of the winning agent that it won the message. The Clearinghouse 570 collects the indicia, such as the virtual funds from the winning rule, and sends them to the agent rule that originally put the message on the message list.

The message list includes a message depot 580 that holds messages that were not acquired. This allows the unacquired messages to be learned by the agent. When the agent is undergoing learning and adaptation, it pulls raw genetic material in from the message depots.

The message depots are arranged as a last-in first-out stack structure. The newer messages are retrieved first, and the older messages will fall off the end if there are more messages than the size of the stack.

Through the transfer of value indicia, such as the virtual currency, through the system, the system is capable of rewarding rules that help achieve an effective or, profitable solution, while not rewarding those that did not lead to effective solutions. Through multiple iterations, rules that receive resources from the environment wind up passing resources further up the chain, because they can bid more for messages. The messages thus wind up forming a chain of rule executions that get reinforced due to their useful or effective behavior.

The amount that a rule bids on a message is directly proportional to the resources that the rule has and how specific the rule is. It is also proportional to how closely the message on the list is matched by the message in the rule. The message primitive that is present in the rule can be called the message detector, because it is used to detect if a matching message is available on the associated message board, internal or external.

The internal message list uses primarily numerical messages, and the message detectors can examine a number range. If the message number on the list falls within the range of the message detector on the rule, then the rule matches the message and will bid on it. The closer the message is to the middle of the of the message detector range the more that the rules will bid on the message. The external message list uses textual messages, where either a direct match or a theoretical proximity to the message is used for matching the message, such as through the use of an ontology.

The agent executes its rules using a state-machine type of method, where the agent performs certain manipulations on the population in a given order. Many of these operations could be performed in parallel, but serial execution can be used as the preferred embodiment.

Figure 7:
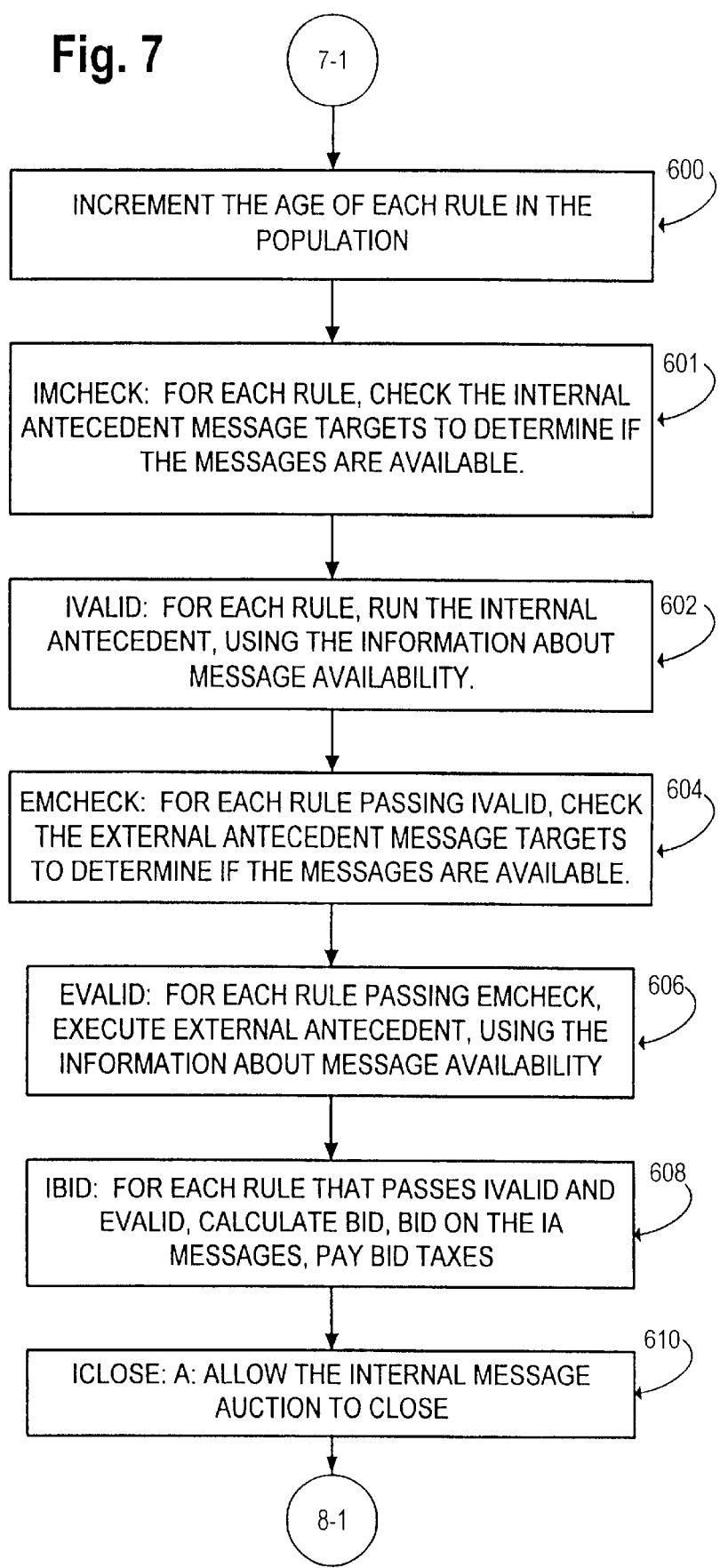
FIGS. 7, 8, and 9 illustrate an agent execution, and learning state machine.
Figure 8:
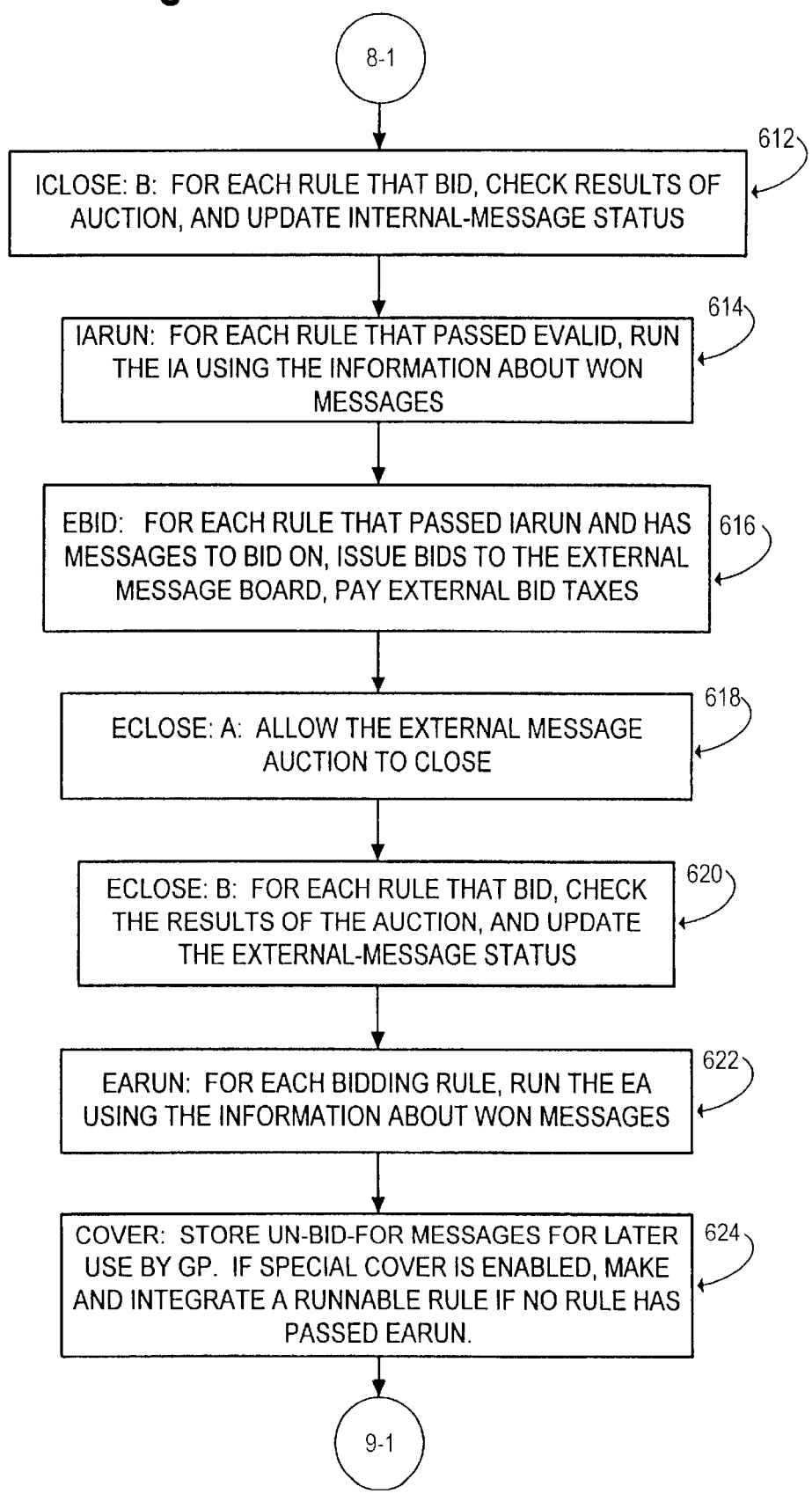
Figure 9:
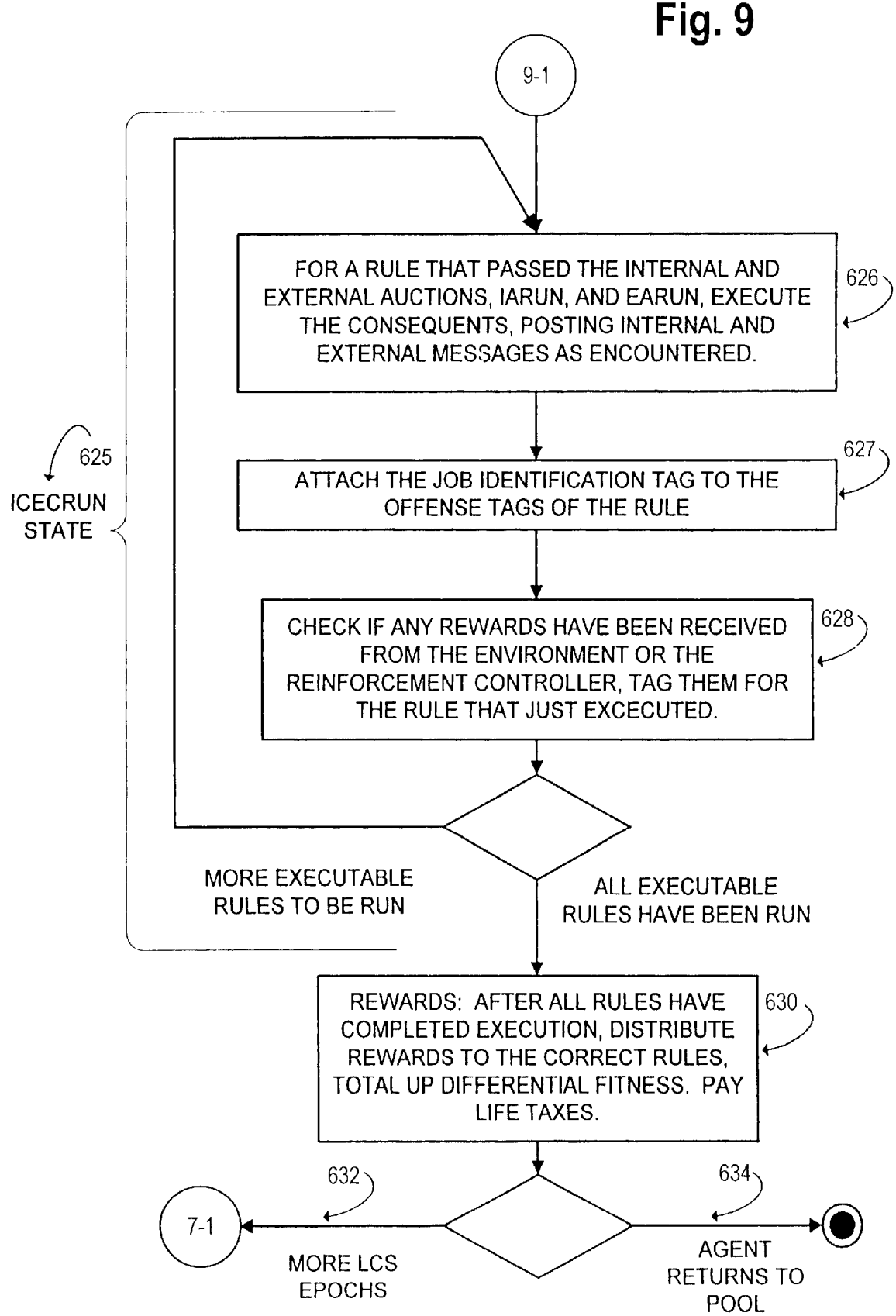

The state-machine that operates inside the agent is illustrated in FIGS. 7–9. In this process, the agent views the environment, and looks at what it is currently doing. The agent then takes any actions that it believes are appropriate, and makes changes to the environment and its internal state. During this process, the agent is expending energy or resources in the form of fitness indicia or virtual funds. Hopefully, the expended resources will be balanced by the rewards it receives for doing the correct things at the correct times.

An agent has two modes of operation, that of learning, and that of executing the rule set. During the execution phase the agent is generally operating in the actual environment, with the learning process disabled. During learning, the agent is generally operating in the simulator and does perform frequent genetic processing and strength updates. These phases can overlap.

At the start of each system epoch, the age of each rule in the population is increased by one step 600. An age greater than zero allows the genetics-processing unit to know that a rule has been through a prior epoch. Rules having age of zero, such as newborn children will not be overwritten during genetic evolution.

Given a rule set, or population, in the step 601 the message targets in the internal antecedent are checked for each rule in the population to see if there is a matching rule in the internal message list. All messages in the internal antecedent are marked to indicate whether a suitably matching message exists on the internal message list.

The system state-machine then moves to state 602. The subprogram in the Internal Antecedent (IA) is run, using the information about the availability of messages on the message list from 601. The IA is run as if it had obtained all the messages that it matched, even though it has not yet bid on them. If the IA returns a Boolean TRUE result after running, then this rule goes on to the next step.

For each rule, in step 604, the external message list is checked for any messages matching the message targets of the external antecedent (EA). The match/no match information is stored in the agent for use in determining if the External Antecedent can run. Step 604 will only be performed for those rules that had passed IVALID in step 602.

In step 606, the external antecedent (EA) is run for each rule passing the EMCHECK, step 604, to see if the external antecedent will return a Boolean TRUE if the messages that it bids on are won. This test is run to see if it is worth bidding on any messages for this rule. If the EA cannot run, based upon the messages currently available, then it is desirable to know this now, before bidding on any messages and paying bid tax. There may be no messages in the external antecedent, thus allowing it to be more general. In this case, it would still be executed and return a TRUE/FALSE Boolean value.

If the rule makes it through all the previous steps, up to and including step 606, then it is possible for the rule to fire in the current environment. First it must place the actual bids on the messages on the message lists, in order to get the messages it needs to execute. Part of this occurs in step 608. Because it may be quicker to conduct the internal auction, the bids are placed here first. The bid tax is paid for every bid placed. This tax comes from the agent that is placing the bid. Each bid includes a small amount of zero-mean Gaussian noise to help break ties during the auction.

After the bids are placed for all eligible rules, the auction house closes the auction, in step 610. The auction compares all the bids. If two or more rules had bid on the same messages, then the rule that had submitted the highest bid wins the message. The winning rule is notified, and pays the bid to the clearinghouse. The clearinghouse subsequently distributes the payment to the rule that posted the message.

In step 612 the results of the auction are registered with each of the rules. The win/lose status of each message that was bid for is set so that each rule can use this information when it runs the antecedent code.

The internal antecedent is run in step 614 for those remaining rule or rules that passed step 606 to determine if it now still can return a TRUE Boolean value now that the results of the auction are in, and the rule has now won whatever messages that it could. This makes the second time that the antecedent is run. The first time, step 602, checks to see if the antecedent would be true if it won all of the messages that were available. This time, in step 614, the system checks to see if the antecedent does actually run, given that it has won the messages that it has won, if any.

In step 616, rules that return true in step 614 may bid on external messages in the environment. The system may have to wait longer in this situation for the external bidding to close. External bid taxes are paid to the external message list. Bidding on external messages is not performed unless the internal messages are won.

Steps 618 and 620 are analogous to steps 610, 612 except they use the external antecedent and the external message list. The external auction closes and the winners are notified. These steps set the win/lose state of the messages in the population that bid on external messages.

Steps 622 operates like step 614 in that it runs the external antecedent for each rule that passed the test of step 614 to see if it is still viable. This checks the rule for final runnability status based on the message that had actually been won. Most steps in this process acts like gates to the next step. This is the final gate.

If a rule makes it through step 622 it will then execute its consequent. It has satisfied both the internal and the external portions of its antecedents, which may have required competing against other rules in the population to get the messages it needed to run. Thus, the most appropriate and more-fit rule executes.

If there were messages on the message boards that were not purchased, the system puts these messages into the respective message depots during the step 624. As the agent learns, it first pulls any available genetic material from the message depots to create its new rules before creating any random data. Thus, it learns to respond to novel situations occurring in the environment and to link up rules through messages to form a chain.

If there is no rule that has passed step 614 and passed step 622 and either purchased an internal message or external message, and the special-cover operation is enabled, then a special cover message operation will be performed where a new rule will be created immediately to allow the system to recognize the current environment. Special cover is only enabled during learning. Cover will be described subsequent to the following discussion of the remaining steps of the state machine.

In state 625, the rules that have made it through all the tests and competitions now get to execute their consequents. This means that rules must have passed steps 622 and 614 and either purchased an internal or an external message. Both the internal and the external consequents now execute. If during their execution, they encounter any messages in their chromosome, then these message are posted on the appropriate message board.

As the agent executes the eligible rules in step 626, the reinforcement controller is continually looking for reasons to reward or punish the agent. The identification number of the current job is placed into the offense tags of the rule that just executed, step 627, to indicate that this executes in the performance of the job. If, during the execution of a rule, a reward was given to the agent, then the reward is tagged with the identification of the rule that was executing in step 628. This rule will be given the reward during step 630.

The REWARDS state, step 630, occurs after all rules have executed. This is when distribution of all reinforcement rewards and punishments, and auction payoffs occurs. Each rule that has a monetary adjustment coming gets the adjustment made to its wallet. Life taxes are also taken at this time. The life tax is a certain percentage of the amount of virtual funds a rule has in its wallet. It helps to dispose of the rules that do not cooperate in the execution of the agent's jobs. Rules that continually are taxed, but never receive any resources will eventually get replaced during genetics processing.

After the rewards have been distributed, the current learning classifer epoch is complete. Generally the system will conduct many such epochs before performing a genetic programming epoch. The execution of learning classifier epochs corresponds to the ontogenetic evolution of a single individual in their lifetime, such as the passage of a year. Hence the age of each surviving rule is increased by a count of 1 for each epoch.

The genetic programming epoch corresponds to a phylogenetic evolution of a species. It is like a new lifetime, since the agent that results from the execution of genetics processing is not the same as the input agent. Its chromosomes have changed, so it will hopefully be better adapted to the environment than its predecessor.

When the agent has processed the entire learning classifier epoch (FIGS. 7–9), then if more epochs are specified for the current job 632, the agent will start at the first step of the epoch processing again; FIG. 7. If all the specified epochs for the job have been completed, the agent returns to the pool, step 634.

Special cover message operations are performed in the COVER state when no existing rule can fire, such as if, a rule did not pass IARUN, step 614, and/or EARUN, step 622, and it did not purchase either an external or an internal message. Special cover message is the most invasive cover operation, because it immediately generates a message that is guaranteed to fire. The new rule uses one of the unrecognized messages of the environment. This rule may mutate, breed, and evolve later, but at least it gets the agent moving.

There is another covering mechanism in the disclosed embodiment that allows the system to evolve to recognize messages, occurring during regular periodic evolution. The second cover message operation, occurring during periodic evolution, also incorporates novel messages that appear on the message boards, but occurs during normal evolution. When a rule is created that contains a message detector; the message to be detected is set to be one of the unbought messages from a message board's message depot, if any unbought messages exist. New messages are created at random if no messages are in the message depot, waiting to be covered. Therefore, the system adapts to new information by evolving to use it.

In a prior binary-string learning classifier system, the act of cover was somewhat simple. There were binary string messages. If none of the binary rules matched the messages, the system would create a new rule using the binary string of the message and random bits to fill in the consequent.

With the program-based learning classifier system of this invention, the components of the rules are more complex, but covering is still needed. In order for a rule to fire in the present instance, the internal and the external antecedents must both return a true value when executed, and at least one message must have been purchased. If no messages are purchased, then the system must adapt to purchase one.

The antecedents of the present system include automatically generated program code, and message detectors. In special-cover-message operation, use is made of whatever portions of the code that had worked in the current environment. Perhaps the rule bought a message or returned a true in either the external or internal antecedent. If no rule fired, then a rule that will fire is created, and, it is made to match the environment as well as possible. For instance, if the external antecedent of Rule A passed but not its internal antecedent, and the internal antecedent of Rule B passed, but not its external antecedent, then a new rule will be made from the external antecedent of Rule A, the internal antecedent of Rule B, and the genetically mated internal and external consequents of both Rule A and Rule B. There are many possibilities as to how to make the new rule.

Figure 10:
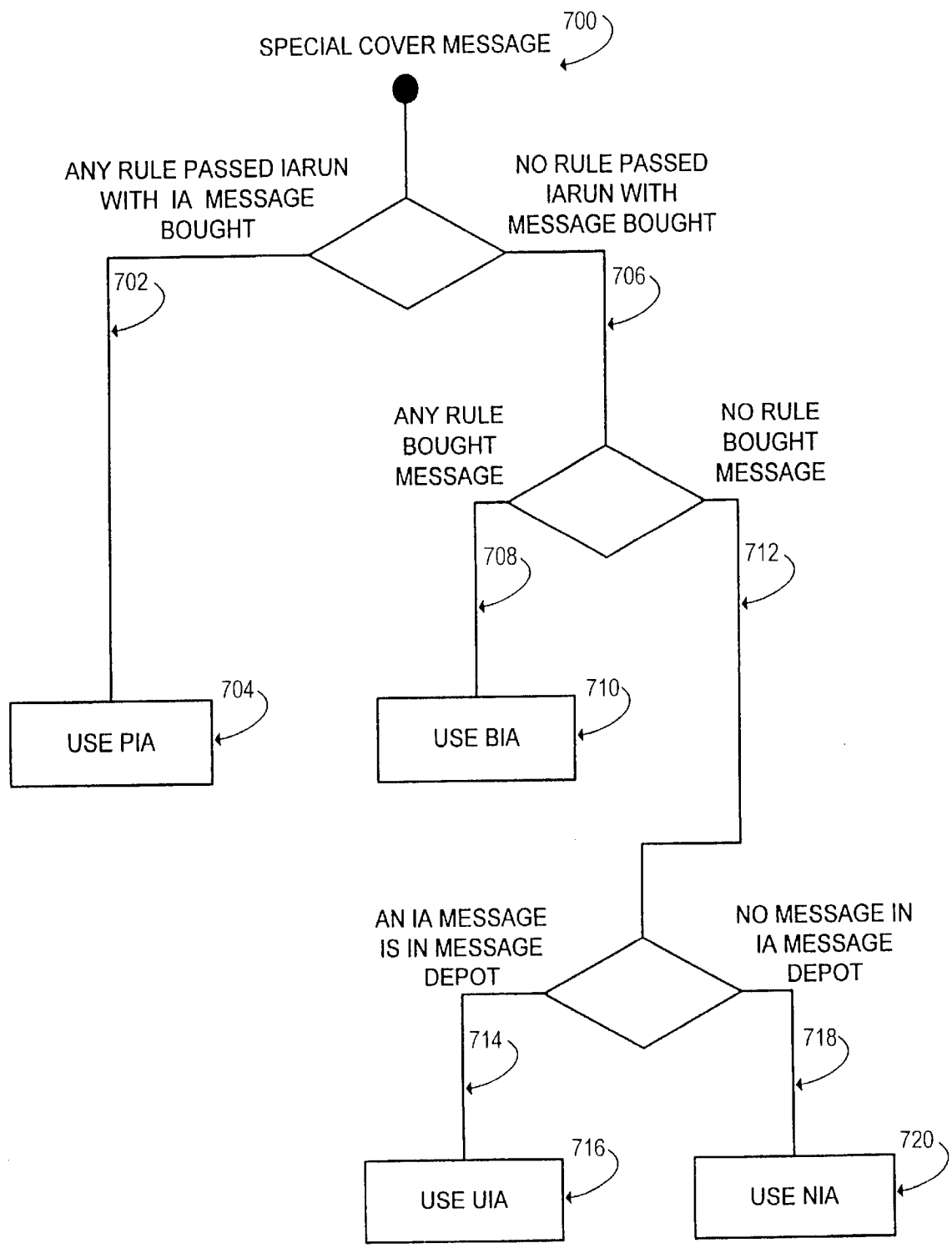
FIG. 10 illustrates the logic behind cover messages.

The process of FIG. 10 illustrates the part of the decision tree that investigates the Internal Antecedent (IA), for choosing how to make the new rule. The External Antecedent part is exactly the same, except that all IA notations are replaced by EA notations.

The process of FIG. 10 is used to determine how to make a new rule when performing the Special Cover Message operation 700, where a new message is created immediately. The special cover message algorithm tries to match the environment as well as possible, to create a new set of Internal Antecedents (IA) and External Antecedents (EA) and Internal Consequents (IC) and External Consequents (EC) for a new rule.

If any rule in the population actually bought an internal message and passed the IARUN step, branch 702, then the new rule will contain the passed IA and will use the consequents that belonged to the rule when it mates with another rule. The result of this test is that the PIA status is set in step 704.

If no rule had successfully passed IARUN branch 706, but had bought a message branch 708, then the USE BIA status is set in step 710. This rule had sufficiently matched the environment in order to buy a message, so its message allele will be used in building the new rule.

If no rule had passed IARUN nor had bought a message, branch 712, then if there is a message waiting in the internal message depot, branch 718, set the USE UIA status step 716 to make the new rule using the uncovered message allele in the message depot. Finally if there is no message in the message depot, branch 718, then set the USE NIA status step 720, to cause the system to create a random new IA rule section containing no message. The External Antecedent, or EA, section of the agents logic is exactly the same, resulting in the following possibilities for the covered rule:

Internal Antecedent:
   PIA: PASSED IARUN AND BOUGHT INTERNAL MESSAGE
   BIA: BOUGHT INTERNAL MESSAGE, DID NOT PASS IARUN
   UIA: UNCOVERED MESSAGE IN INTERNAL MESSAGE DEPOT
      NO MESSAGE BOUGHT, DID NOT PASS IARUN
   NIA: NO MESSAGE IN INTERNAL MESSAGE DEPOT
      NO MESSAGE BOUGHT, DID NOT PASS IARUN External Antecedent:
   PEA: PASSED EARUN AND BOUGHT EXTERNAL MESSAGE
   BEA: BOUGHT EXTERNAL MESSAGE, DID NOT PASS EARUN
   UEA: UNCOVERED MESSAGE IN EXTERNAL MESSAGE DEPOT
      NO MESSAGE BOUGHT, DID NOT PASS EARUN
   NEA: NO MESSAGES IN EXTERNAL MESSAGE LIST.
      NO MESSAGE BOUGHT, DID NOT PASS EARUN Thus, the following combinations are possible, with the associated actions taken as indicated:

| INTERNAL ANTECEDENT | EXTERNAL ANTECEDENT | RULE CONSTRUCTOR RESULT |
|---|---|---|
| PIA | PEA | Find the strongest rule with a passing IA and the strongest rule with a passing EA. At least one of the antecedents must have purchased a message. Take the IA that passed, the EA that passed, and crossover the parents to make the IC and EC. |
| PIA | BEA | Find the strongest rule with a passing IA. Take the IA that passed. Make a new EA message using the EA message that was bought by the strongest rule. Crossover the parents to make the IC and EC. |
| PIA | UEA | Find the strongest rule with a passing IA. Take the IA that passed. Make a basic, but runnable EA chromosome using a covered external message from the EA message depot. Make the IC and EC from mutations of the single parent with PIA. |
| PIA | NEA | Find the strongest rule with a passing IA. Take the IA that passed. Make a basic, but runnable EA, without a message. Make the IC and EC from mutations of the single parent with PIA. |
| BIA | PEA | Make a new IA message using the IA message that was bought by the strongest rule. Take the EA that passed, and crossover the parents to make the IC and EC. |
| BIA | BEA | Make a new IA message using the IA message that was bought by the strongest rule. Make a new EA message using the EA message that was bought by the strongest rule. Crossover the parents to make the IC and EC. |
| BIA | UEA | Make a new IA message using the IA message that was bought by the strongest rule. Make a basic, but runnable EA chromosome using a covered external message from the EA message depot. Make the IC and EC from mutations of the single parent with BIA. |
| BIA | NEA | Make a new IA message using the IA message that was bought by the strongest rule. Make a basic, but runnable EA, without a message. Make the IC and EC from mutations of the single parent with BIA. |
| UIA | PEA | Make a basic, but runnable IA chromosome using a covered internal message from the IA message depot. Find the strongest rule with a passing EA. Take the EA that passed. Make the IC and EC from mutations of the single parent with PEA. |
| UIA | BEA | Make a basic, but runnable IA chromosome using a covered internal message from the IA message depot. Make a new EA message using the EA message that was bought by the strongest rule. Make the IC and EC from mutations of the single parent with BEA. |
| UIA | UEA | Make a basic, but runnable IA chromosome using a covered internal message from the IA message depot. Make a basic, but runnable EA chromosome using a covered external message from the EA message depot. Make the IC and EC as randomly generated new gene graphs |
| UIA | NEA | Make a basic, but runnable IA chromosome using a covered internal message from the IA message depot. Make a basic, but runnable EA, without a message. Make the IC and EC as randomly generated new gene graphs. |
| NIA | PEA | Make a basic, but runnable IA, without a message. Find the strongest rule with a passing EA. Take the EA that passed. Make the IC and EC from mutations of the single parent with PEA. |
| NIA | BEA | Make a basic, but runnable IA, without a message. Make a new EA message using the message that was bought by the strongest rule. Make the IC and EC from mutations of the single parent with BEA. |
| NIA | UEA | Make a basic, but runnable IA, without a message. Make a basic, but runnable EA chromosome using a covered external message from the EIA message depot. Make the IC and EC as randomly generated new gene graphs. |
| NIA | NEA | Do nothing. Proceed to the next epoch of LCS processing. |

Thus, a new rule is created that is then integrated immediately into the rule list. This new rule was created especially to respond to the current state of the environment. Any unbought messages will be left on the message lists.

The age of the newly created rule is set to negative one to avoid termination in genetics processing, as would occur if genetic processing occurs immediately after this epoch. The age of an adult must be greater than zero to be replaced by a new child during genetics processing. Thus the individual can make it to the next epoch, not having been eliminated by integration in genetics processing, and will attempt to purchase the new messages on the board that it just has learned about. The rule should then fire.

Figure 11:
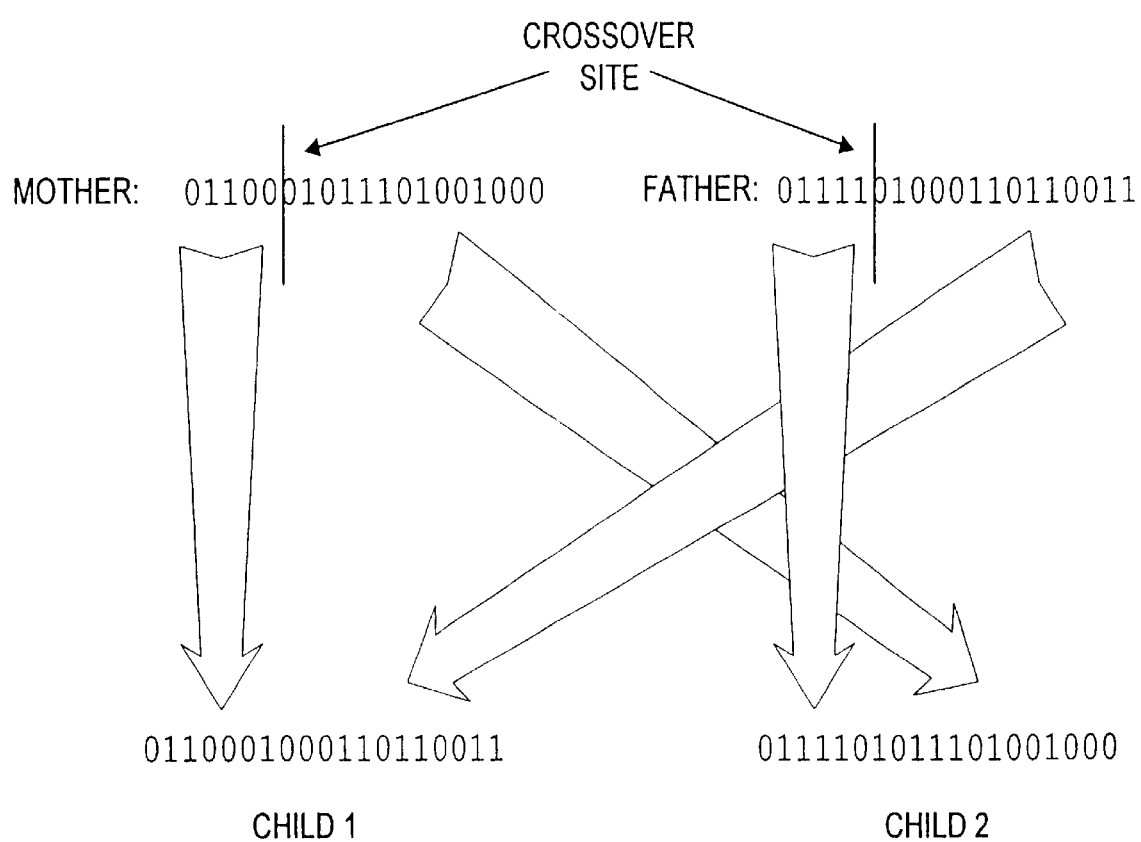
FIG. 11 illustrates an example of genetic crossover using a known type of binary-string chromosome.

The genetics processing will now be described. In known genetic algorithms, a chromosome consists of a string of binary digits. The crossover operation on this chromosome is performed by cutting the mother and the father chromosome at the same point, and exchanging the bit patterns to obtain two new children. This known process is illustrated in FIG. 11. The chromosomes of the mother and the father are cut at the crossover site, and recombined to make two new children.

Figure 12:
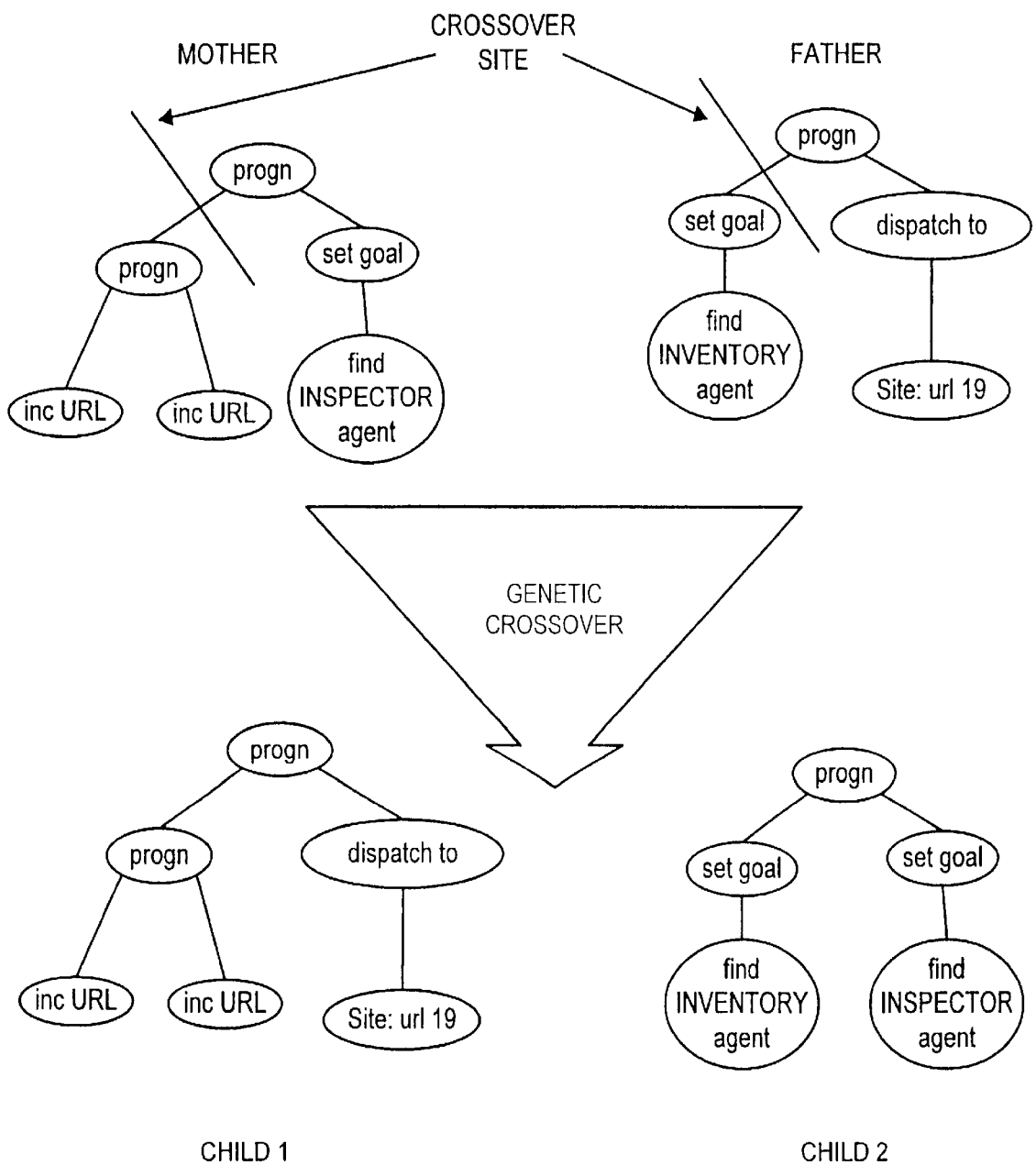
FIG. 12 illustrates an example of genetic crossover using a chromosome made out of functions and terminals to produce new rules in accordance herewith.

In known genetic programming, the concept is similar, but the crossover occurs on a gene graph as shown in FIG. 12. A point is randomly chosen on the gene graph of the mother, and a similar, compatible, point is chosen on the father. The remainder of the tree beneath the chosen point is clipped off and exchanged with that of the father. This generates two children as shown. The children are made up of the parts of the parents. It is important that the crossover site of both the father and the mother be chosen such that the gene trees that are being swapped both return the same type of data. This is controlled through checking the return types of both the father's and the mother's subtree to ensure compatibility.

There is also a known mutation operation used in genetic programming, in which a point is chosen on the gene graph, like the crossover point, and beneath that point new random programs are generated. The new gene subtree is generated with the constraint that it must return a data element of the correct type to replace the branch that had been trimmed off.

Crossover works only with the data that had been preexisting in the population. Mutation brings in new information and possibilities. For instance, mutation allows different messages to be responded to, it allows different sites to be learned and new commands, or functions, to be incorporated into the chromosome. When genetics processing is occurring, the probability of performing crossover or mutation is a controlled parameter.

Unlike genetic programming, where a single best individual is sought, the system of the present invention seeks to maintain diversity in the population so as to handle multiple jobs. It is important that as the agent learns new information, the old information is not forgotten.

Figure 13:
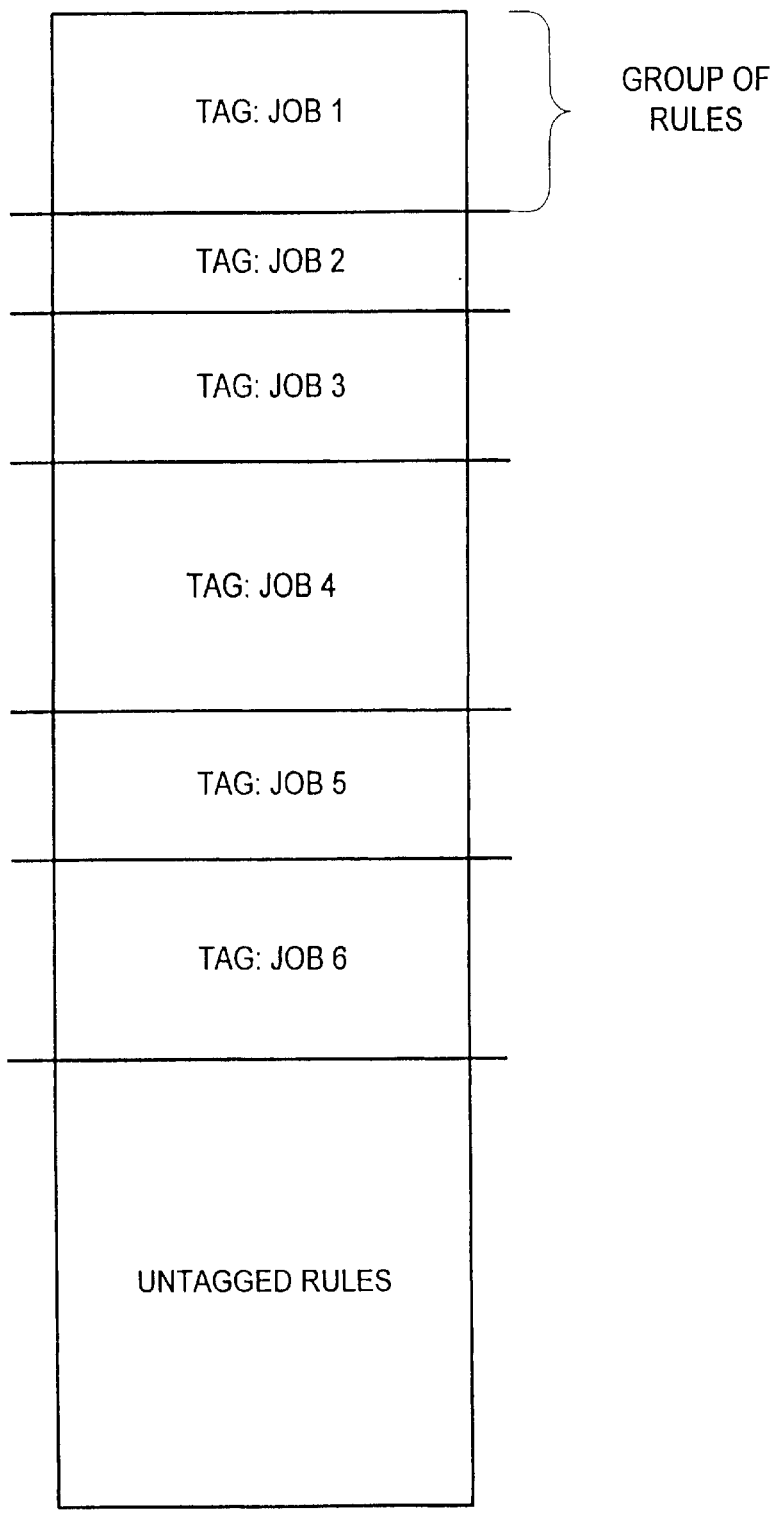
FIG. 13 illustrates groupings that correspond to jobs in the population of rules.

As FIG. 13 illustrates, the agent's rule population is made up of groups of rules that have learned to cooperate to work different jobs. The rules are tagged with the name of the job that they have learned. The population also includes untagged rules that have not been associated with any jobs. Some job groups require more rules due to the nature of the job and their stage of learning the job.

When it comes time for virtual mating, there is high pressure to mate within the job type, or with untagged rules. Also when new children are produced, there is high pressure to eliminate another, possibly less effective, individual within the job type of the parent, or in the untagged rules, in order to provide a place for the new child. The pressure is controlled using probability, statistics, and inviolate rules, thus preventing elimination of individuals from another job type.

Figure 14:
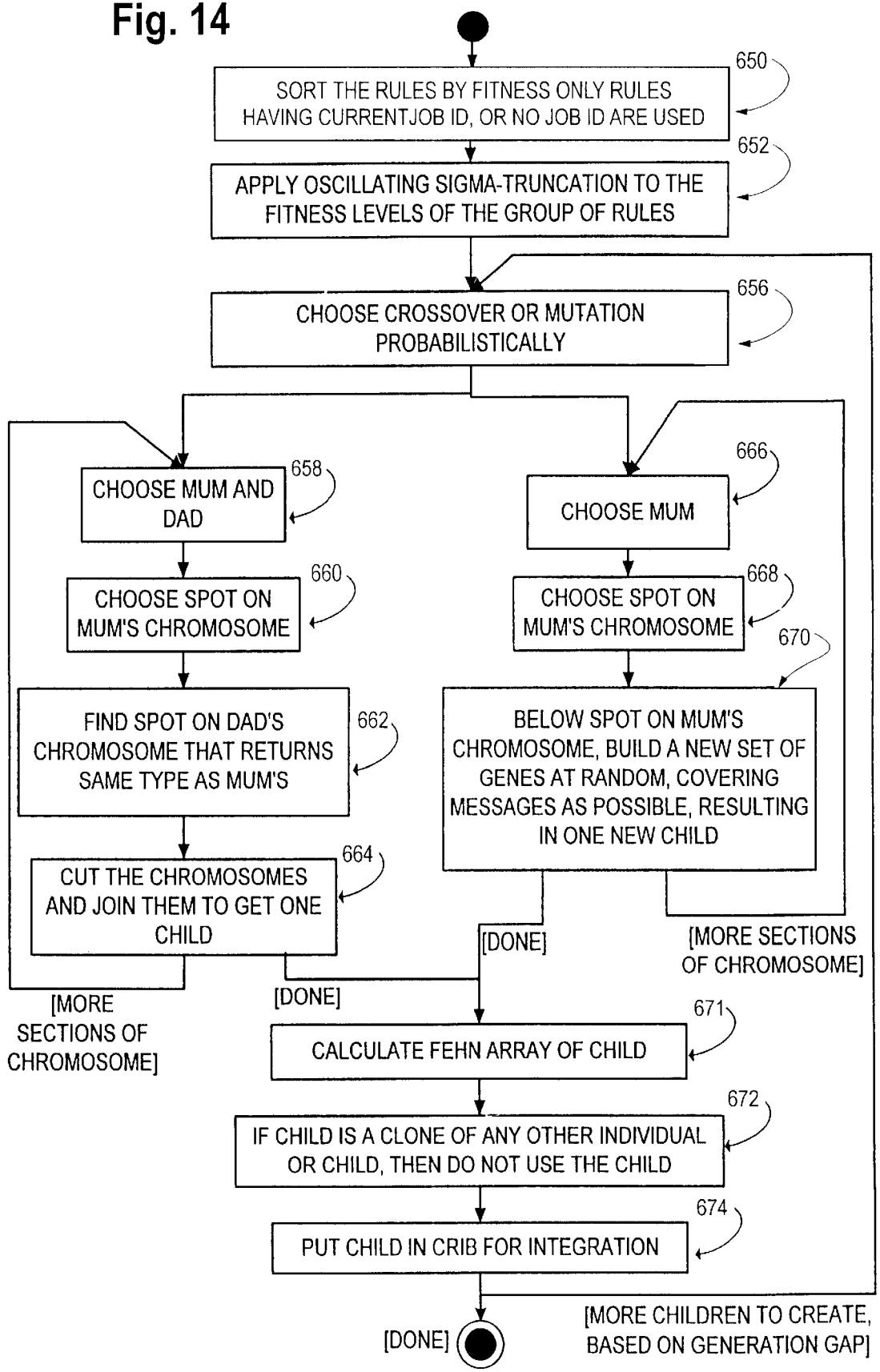
FIG. 14 illustrates genetics processing on a population of rules.

With reference to FIG. 14, when a rule list first comes in for evolution, the individuals are sorted with respect to fitness, step 650. The fitness values in the rules are then adjusted using an oscillating sigma-truncation method step 652, in order to preserve diversity while also oscillating to increase fitness pressure periodically. Sigma truncation is a method used to compress the fitness of individuals in the population to prevent one individual from overtaking the population by being over-selected.

The different fitnesses in the population are adjusted to be closer in magnitude to each other, and thus to produce more possibility of selection for even the lower-performing rules, hence increasing diversity. Sigma truncation controls the selection pressure in the system. It has been made to oscillate because it is desired to have low selection pressure in the beginning in order to encourage diversity, but to increase the selection pressure later to help remove poorly-performing individuals while increasing the speed of evolution. In an oscillating fashion, the selection pressure is modulated up and down to allow introduction of diversity periodically, thus relieving deadbeat operation where the system may be stuck performing a certain behavior.

The algorithm is performed in the following manner. The set of rules, X, is indexed by an integer count. The raw strength of the rule set is U(X). It is a vector of real numbers, equal to the amount of money in the rule's wallet. The calculated fitness of the rules is F(U(X)).

The fitness is calculated as:

$$F(U(X)) = g(U(X) - (\overline{U(X)} - c\sigma))$$

where $$g = \begin{cases} x & \text{if } x > 0 \\ 0 & \text{otherwise} \end{cases}$$

$$\overline{U(X)} = \frac{1}{N} \sum_{n=0}^{n=N-1} U(X(n))$$

is the expected value of U(X)
σ is the standard deviation of U(X)

c is a parameter that controls the selection pressure, lesser c for more pressure
N is the number of individuals in; the population
The proportioned rule set is:

$$P(F(U(X))) = \frac{F(U(X))}{\langle F(U(X)) \rangle} = \frac{g(U(X) - (\overline{U(X)} - c\sigma))}{\langle g(U(X) - (\overline{U(X)} - c\sigma)) \rangle}$$

where
<•> means expected value and P(F(U(X))) is a vector of real numbers with one entry for each rule.

The parameter c is modulated throughout the learning process to increase either selection (c↓) or diversity (c↑) pressure. For a vector of N rules, X(n), where 0<n<N−1, the standard deviation is calculated as $$\sigma = \sigma(X(n)) = \sqrt{\frac{1}{N-1} \sum_{n=0}^{N-1} (U(x(n)) - \overline{U(X)})^2}$$

The standard deviation form that is associated with a sampled population was chosen for this use because the rules may be evolved in different groups, such that only a separate subset of the rules are genetically manipulated at a time.

The sigma-truncation algorithm will be modulated by c to conversely emphasize diversity or provide more fitness pressure for elitist selection. The modulation equation shall be a sinusoid, initially set to emphasize diversity. It has the following form:

$$c = K \sin(F \cdot GN + \phi) + B$$

where
K=magnitude of selection modality oscillation
B=offset for selection modality oscillation mean
F=frequency of oscillation of the selection modality [cycles/generation]
GN=Generation number
φ=phase setting to emphasize diversity during earliest generations The Generation number is incremented after every complete genetic programming session, when all agents and all jobs of those agents have been evolved.

Figure 15A:
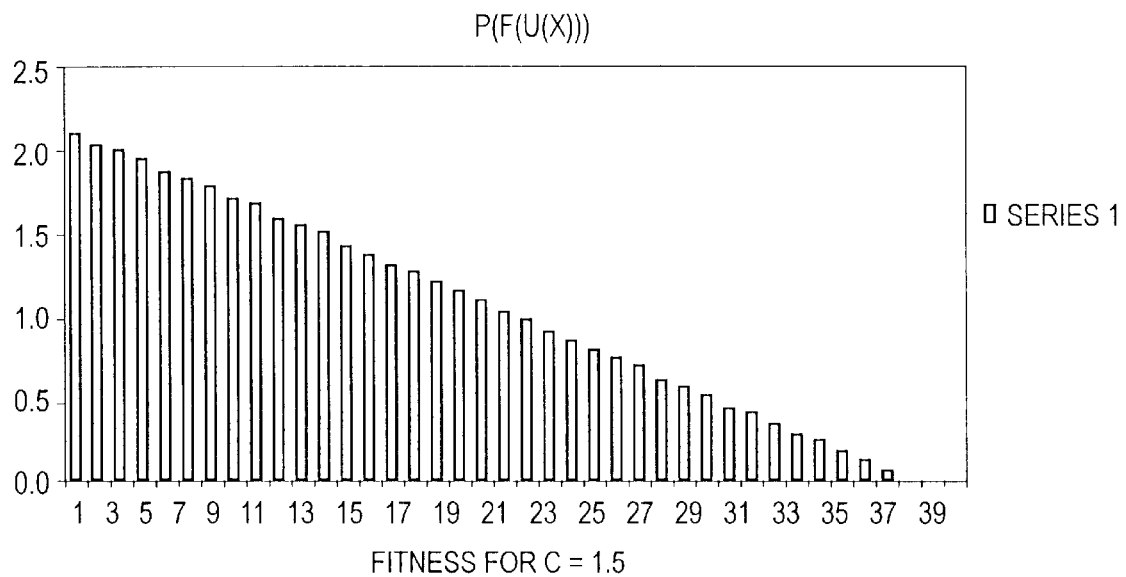
FIG. 15 illustrates different levels of rule fitnesses in the population for different levels of sigma-truncation.
Figure 15B:
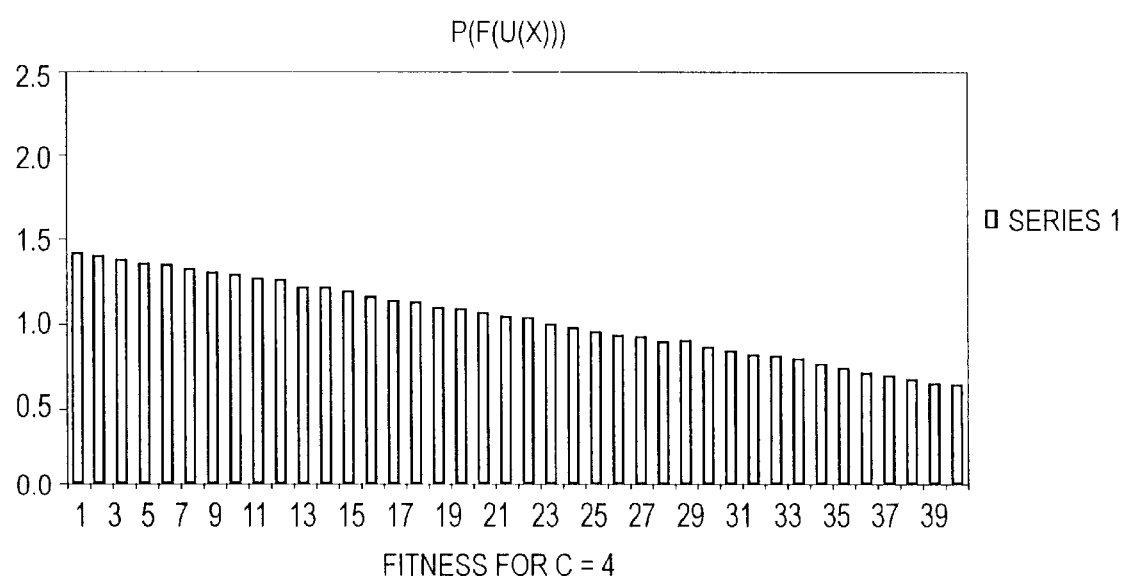

The effect of oscillating sigma truncation can be seen in FIG. 15. In FIG. 15A, a larger amount of selection pressure is used, with c=1.5. Some of the lowest fit individuals, individuals 38, 39, and 40, are truncated below zero and will not be used. Conversely, when c continues to phase-shift in its oscillation, c may end up at c=4.0, as seen in FIG. 15B. Here, there is a more level distribution of fitness values. While the more fit are still favored, more diversity is encouraged because the lower fit individuals were controlled to deviate less from the most fit individuals.

After the rules have been sorted by fitness, and the fitness pre-processed for controlled selection characteristics, then the evolution acts begin. There is a probability of doing mutation, $P_M$, and a probability of doing crossover, $P_c = 1 - P_M$. A uniformly distributed random number between 0 and 1 is obtained, and if it is greater than the probability of mutation, then crossover is performed, otherwise mutation is performed. This occurs in step 656.

If crossover is performed, then two individuals must be chosen to supply the genetic material. These individuals are termed the mum and the dad for distinguishing purposes.

To select an individual to participate in mating or mutation, the system uses fitness-proportional selection. Fitness proportional selection means that the possibility of being selected is proportional to the fitness of the individual. It is as if each individual occupied a portion of a roulette wheel, having a size proportional to the amount of fitness it possesses with respect to the other individuals in the system. Individuals with a large amount of fitness would occupy a large portion of the roulette wheel and be chosen much more often. That is one reason to perform sigma-truncation, so that one individual will not dominate the population by reproducing much more frequently.

The mum and the dad are selected, step 658, by first obtaining a uniformly distributed random number, and multiplying it by the number of individuals in the population. Then the sorted fitnesses are arranged in a cumulative manner. Where the magnitude of the amplified random number falls in the cumulative fitness calculation determines the rules being chosen. A different random number is chosen for each of the mum and dad. If the same individual is chosen as dad and also as mum, then a new dad is chosen.

After the parent rules are chosen, the mum is cloned, and a spot on its programmatic chromosome is chosen at random step 660. A branch is then selected on the dad. A branch from dad is chosen randomly, step 662, from amongst all the possible branches in dad that return the same data type as the branch being cut off of mum.

A copy of the selected chromosome branch from dad is then moved, step 664, to replace the selected chromosome branch from mum. If no suitable branch could be found in dad, or if the resulting child has a gene graph depth greater than pre-specified then the mum is returned as the new child.

Because four sets of evolution are performed for each chromosome, having one of the sets come back as a clone is acceptable, having all four sets come back as a clone is deemed to be not acceptable and is checked in the clone test after the complete child chromosome is created. The four parts of the chromosome that are created are the Internal Antecedent, the External Antecedent, the Internal Consequent, and the External Consequent. In each of these cases, a different set of functions and terminals may be used to ensure that internal or external, or antecedent or consequent chromosome sections are created. These sections are linked together with the structure applied in accordance herewith, as a structured if-then rule.

If the mutation operation is chosen, then only one parent needs to be selected. This parent, the mum, is selected, step 666, in the same fitness-proportional selection manner that the parents are selected in the crossover algorithm. A portion of mum's chromosome is selected for mutation step 668. A new random gene branch is created on mum, starting at the randomly chosen spot of mum's original chromosome step 670.

New messages may be created in the process of creating this new gene branch. During the random creation of a gene branch, any functions or terminals, including the message terminal, may be chosen for inclusion, as long as it returns the expected data type so that it fits into the gene graph correctly. When creating a new Internal Message primitive, the message depot of the internal message list is checked to see if any messages were stored there because they hadn't been bought. If so, the new message is created to match the unbought message, thus adapting the system to recognize the new message. If no messages are stored on the message depot, then a new message is created at random.

After the new child has been created, a clone check is performed to see if any individuals in the population already exist that match the child, and if so then the child is not used, and a new child is created. The clone check performs an item-by-item check of each of the four gene graphs in the chromosome, for the child versus each existing individual in the population. If the child differs by at least one gene from every other individual, then the child is stored in crib 147 for integration.

The crib is just a holding place for the accepted children as all the children are tested. The child is not put directly into the population, so as to avoid terminating of any adults prematurely, before they may have had a chance to mate.

To help preserve diversity, not all of the adult individuals are terminating at each new generation. There is a generation gap implemented such that only a percentage of the individuals are replaced in any generation. The generation gap parameter, G, represents the amount of population to be replaced, and varies as:

$$\frac{1}{N} \le G \le 1$$

where N is the number of individuals in the population. Thus, if G is set to 1/N, only one individual will be replaced, but if G is set to 1, all the individuals will be replaced. The typical percentage of rules to be replace per generation is 2% to 4%, corresponding to G=0.02 to 0.04.

The actual number of individuals to be replaced, and hence children to be put into the crib, is $$g=N*G.$$

therefore, g varies from one individual to all N individuals getting replaced in a single generation.

After all the children have been created and put into the crib, then the adults may be selected for replacement. This integration operation is performed on a job-by-job basis, so children created under one job cannot eliminate adults that have a defensive tag of another job.

Children can only replace adults from their own job, or unassigned adults, not tagged for any job. Also, indiscriminate replacement of individuals in the adult population could have detrimental results. This would occur if children replaced randomly selected adults.

To promote diversity, the children are compared to all eligible adults to find the adults that they are most similar to. A group of the most similar adults is defined, and the least fit adult of this group is selected off for replacement with the new child. This technique is called crowding.

Crowding serves to help preserve diversity in the population, because it makes it harder for one type of individual to take over the population. If one type of individual could displace any other individual, then, assuming it had a moderately high level of fitness, it would quickly spread through the whole population. With loss of diversity, the ability to perform multiple tasks, and to attain higher levels of fitness would be decreased through the monotony of having just one type of individual.

A measure of similarity must be used to judge the closeness of one individual to another. In ordinary genetic algorithms, that use bit strings for chromosomes, the comparison is implemented by comparing each bit position of the child with each bit position of the parent. A crowding value is adjusted based upon the level of match in the comparison. If the child bit position had a 1, but the parent had a 0, then the comparison would add −1 to the comparison value. If the bits matched, then a +1 would be added. This comparison technique was sufficient with the limited symbol set and the fixed length chromosome, but was insufficient for a random-length programming-based chromosome.

A comparison method in accordance herewith allows random-length program-based chromosomes to be compared. The set of all possible gene graphs, with all valid combinations of the various functions and terminals is viewed as a hyperspace. A given gene graph comprises a hyperplane in this hyperspace of possibilities.

To provide a way to compare one gene graph to another, some basic layout must be provided, such as a grid, as analogue to the bit positions in the binary string. In a digital computer, limits are placed on certain memory constraints, such that the data structures will be constrained to a maximum size. The sizes of the gene graphs are controlled by setting a maximum depth parameter and by limiting the fan-in of the functions, so that each node on the graph can have only so many branches feeding into it. Thus the maximum possible number of nodes can be determined, and any of the possible gene graphs from the hyperspace of gene graphs, possessing the limitations on depth and fan-in, can be represented within this data structure.

The data structure can be indexed and laid out in a linear array with results that cause the different structures to always appear in the same locations in the array. The lack of an element in the array translates into a structural difference in the gene graph. For ease of comparison, the nodes contain numbers that represent the function or terminal. Each different function or terminal has a different, unique number.

Figure 16:
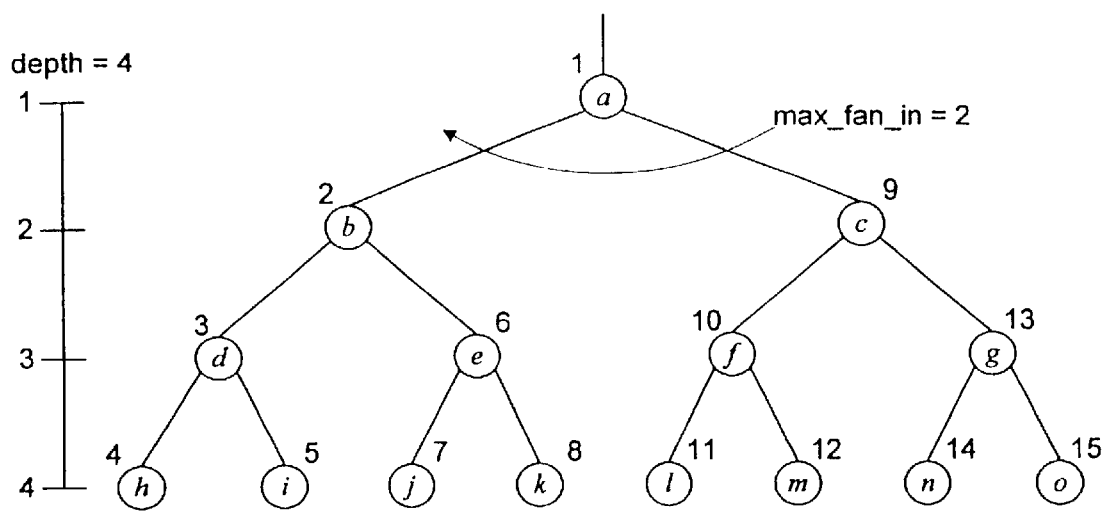
FIG. 16 illustrates an example of a fully dimensioned gene graph that holds all possible programs constructed using functions having two arguments at maximum, and having a maximum depth of four.

The gene graph of FIG. 16 illustrates a complete expansion of all nodes and links possible for a genetic program that is made up of functions having a maximum fan-in of 2, and it has a maximum graph depth of 4. These maximums are used, although not all nodes might have this maximum fan-in, i.e. terminals, nor might all graphs have the max depth. But all gene graphs made up within the constraints imposed by the max depth and max fan in will be representable using the notation herein developed, and be directly comparable to any other gene graph built with these constraints.

The structure of the gene graph of FIG. 16 allows the following organization of node names to be constructed, where the contents represents functions or terminals:

| Node | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Contents | a | b | d | h | i | e | j | k | c | f | l | m | g | n | o |

This structure allows all gene graphs that were created with the given depth and max-fan-in to be represented, and compared. This indexing is called fully expanded hyperdimensional notation, or FEHN.

Figure 17A:
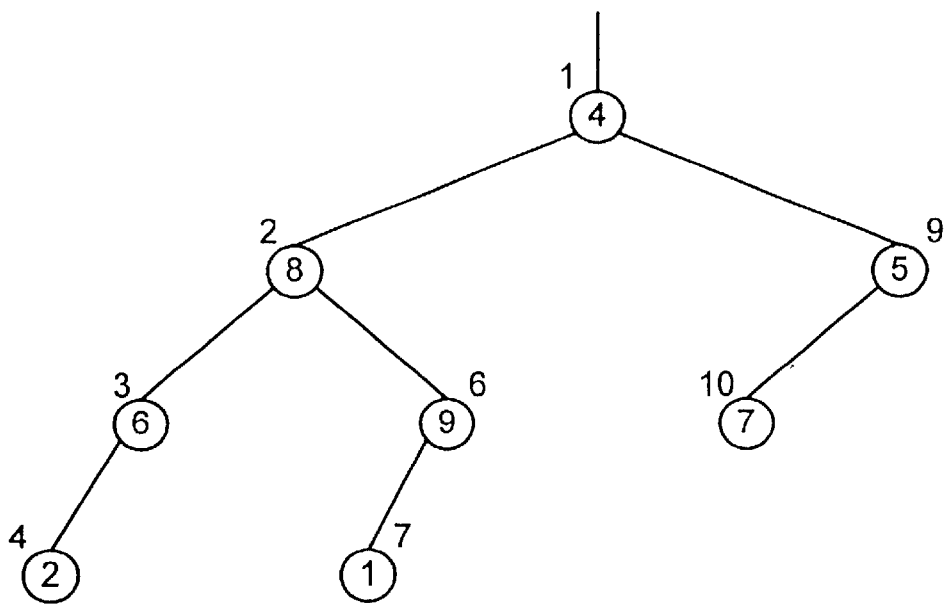
FIG. 17 illustrates example gene graphs that may be constructed in the fully-dimensioned graph of FIG. 16.
Figure 17B:
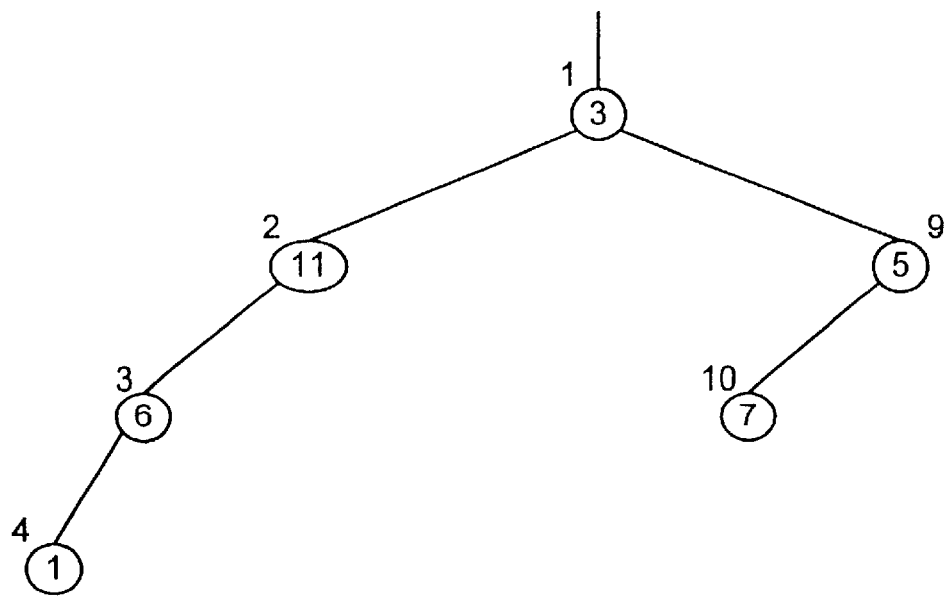

The FEHN array structure allows all comparisons to be performed with a linear array. For instance, a pair of gene graphs is illustrated in FIGS. 17A and 17B. These gene graphs were both created with the same parameters for depth and max-fan-in. The interior of the nodes contains an integer number that specifies which function or terminal is to be used in this location. No unique function or terminal will have the same number as any other function or terminal. Thus, the two gene graphs may be compared, structurally and by contents, by using the indexing method described. The match score between two gene graphs is the sum of the match scores of each of the positions in their associated FEHN array. These match scores are:

| COMPARISON | MATCH SCORE |
|---|---|
| exact match of two, non-zero items at the same location in the FEHN array | +2 |
| mismatch of two, non-zero items at the same location in the FEHN array | −2 |
| mismatch between one non-zero item and one zero item at the same location in the FEHN array | −1 |
| if both items are zero at the same location in the FEHN array | 0 |

Representing the gene graph of FIG. 17A in prefix functional notation yields:

(4 (8 (6 2) (9 1)) (5 7))

which might stand for:

(AND (OR (agentpresent(info) currentSite(library)) (weather(rainy)) Using the fully-expanded hyperdimensional notation, FEHN, the two gene graphs in FIGS. 17A and 17B may be written as:

| Node | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| FIG. 17A Contents | 4 | 8 | 6 | 2 | 0 | 9 | 1 | 0 | 5 | 7 | 0 | 0 | 0 | 0 | 0 |
| FIG. 17B Contents | 3 | 11 | 6 | 1 | 0 | 0 | 0 | 0 | 5 | 7 | 0 | 0 | 0 | 0 | 0 |
| score | −2 | −2 | +2 | −1 | 0 | −1 | −1 | 0 | +2 | +2 | 0 | 0 | 0 | 0 | 0 |

Total score = −2−2+2−1−1−1+2+2 = −1

Having a numerical representation of the gene graph also facilitates the comparison of two individuals to see if they are duplicates, or clones. To preserve diversity, clones are not put into the population. Before children are placed into the crib, each child is compared to the other individuals in the population, and discarded if it is a clone. The comparison takes place by scanning through the FEHN arrays of the two individuals simultaneously. If all positions match, then the individual is a clone.

Figure 18:
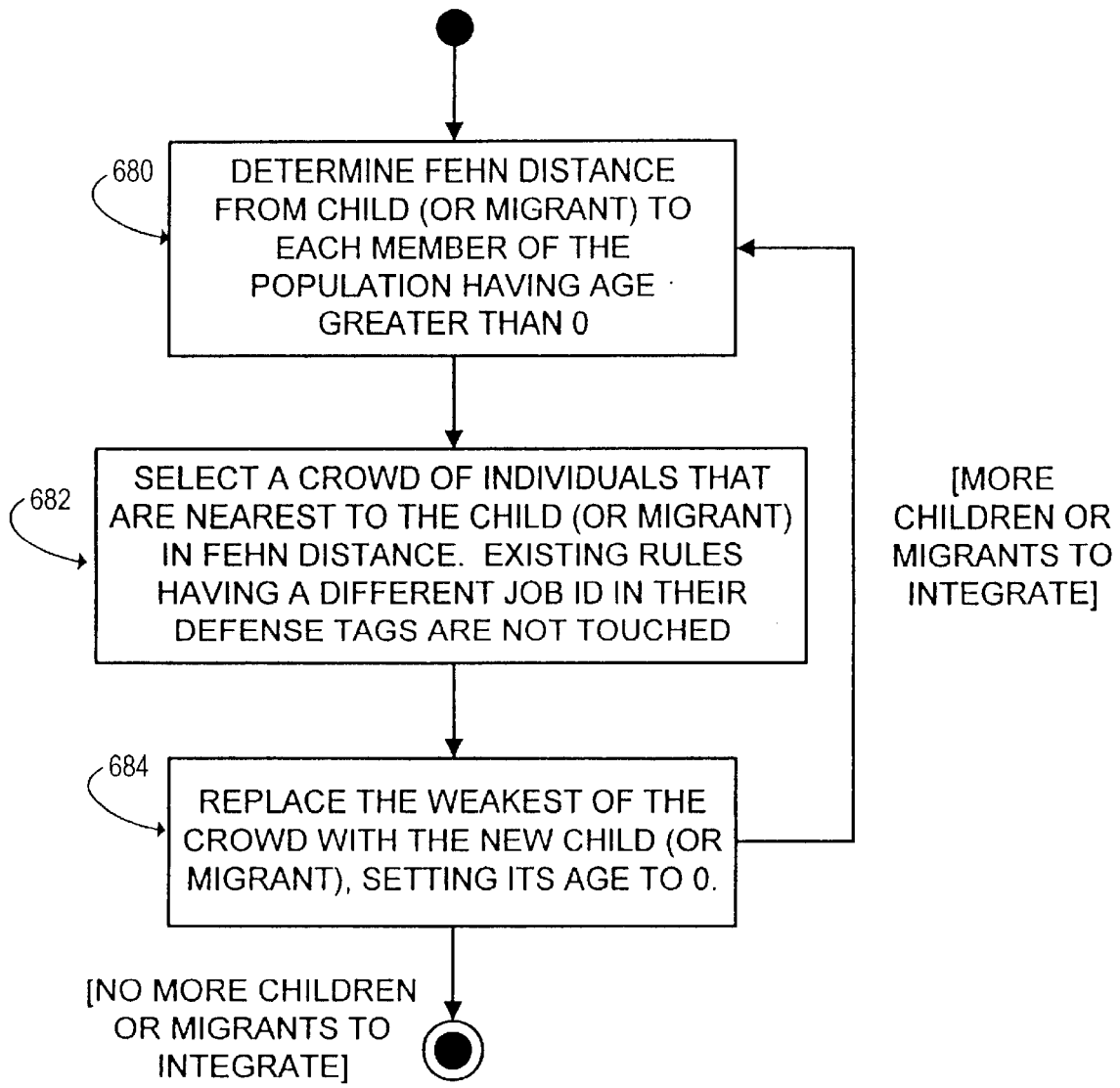
FIG. 18 illustrates agent-level maintenance and training.

Integration of a child into the population is illustrated in FIG. 18. The FEHN array distance from each child to each of the adults in the population is calculated, step 680. Children are not replaced in the same generation that they are created. The children are given an age of 0 to distinguish them from adults during the integration of multiple children in a given generation.

After the distance measures have been determined, a group of individuals with the highest match score is chosen from the population step 682. Rules having different job tags are not chosen. Isolation of integration by job tag preserves the knowledge learned about other jobs. The job knowledge will not be overwritten, and will be unaffected by evolution and message covering.

The new child replaces the weakest, or least fit, individual in the selected group of individuals, step 684. This process continues for all children in the crib, and then for all the individuals in the immigrant depot.

Mating also occurs at the agent level. Multiple agents are evolved simultaneously. A pool of agents learns a job. As an agent attempts to perform a job, the rules that fire within the agent are tagged as being part of that job.

Periodically, all agents are tested for their performance against each other in the performance of that job. The best performing agent is identified. The rule chain pertaining to that job in the agent is copied to a Best Agent. The job tags in the rules identify this rule chain.

When a chain is copied into the Best Agent, the pre-existing chain for that job in Best Agent is erased. The rule set of the Best Agent is periodically copied to make a new agent in the agent pool. The Best Agent is the agent that is used to perform the jobs in the environment, and holds the best evolved solutions.

Figure 19:
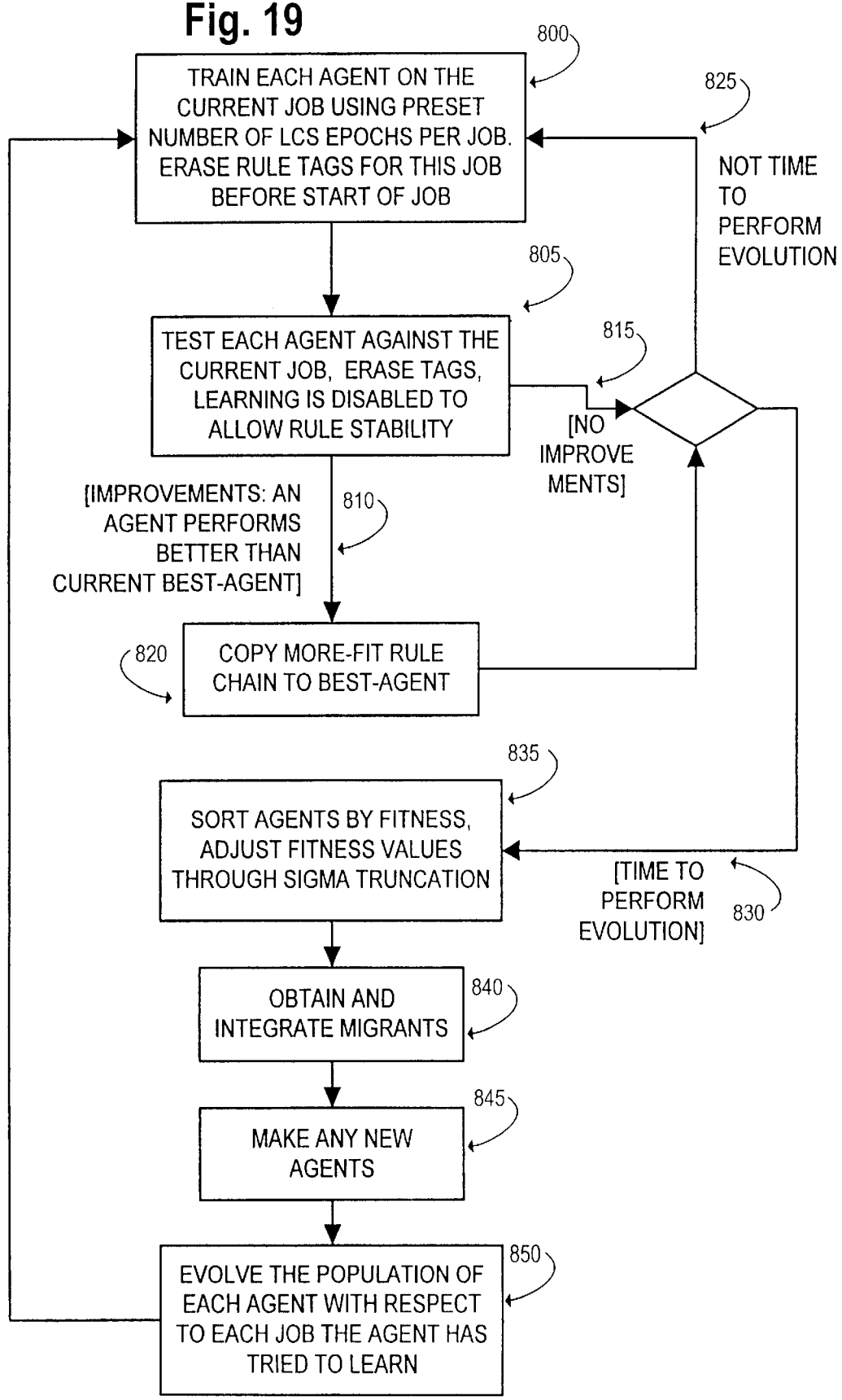
FIG. 19 illustrates integration of a child or migrant into a population of rules.

The agent pool is maintained as illustrated in FIG. 19. This figure indicates when the agents are tested and evolved. When agents are learning, step 800, a job is repetitively provided to each agent, along with the job's fitness function. For a given number of iterations specified in the job itself, each agent in the pool that is learning this job will cycle through learning classifier epochs to try to perform this job.

The number of epochs to devote to the job cycle is specified in the job itself. Thus, an agent that takes too long to perform a job will be interrupted when the maximum epoch limit is reached.

Before each job starts, the tags of each rule are checked to see if they contain the tag for this job, and if so that tag is erased. While the agent attempts to perform the job, it re-tags the rule if the rule executes in the current job attempt. As the agent attempts to execute the job in this learning mode, the fitness function rewards the agent rules, and the strengths of the various rules adapt as messages are bought and sold, and rewards or punishments are allocated. This type of job execution can be likened to ontogenous evolution, where changes within an individual's lifetime cause changes to the individual.

The type of fitness that is used for the comparison of agent performance can be called differential fitness. This fitness is accumulated over one job cycle.

Differential fitness consists of only the rewards or punishments received in relation to processing the job. It does not include any effects of the buying and selling of messages or of taxation. This allows various agents, of different strengths, to be compared directly, with respect to the job itself.

After each agent has tried to solve the job for the predetermined number of iterations, adaptation is disabled and the agent is tested against the job step 805 to see how much reward is obtained. The agent that gets the most reward from the fitness function is chosen to be the best agent, and its rule chain for that job is copied to the Best Agent's population.

Subsequently, any agent that performs better, branch 810 than the previously best agent will replace the current best agent, step 820. More precisely, the rules that performed the job in the good performing agent are copied into the Best Agent, replacing the previous rules that pertained to that job. Tags are applied to each rule as it is tested in step 805 to indicate what job it was executed on. If, when all the agents are tested in step 805, there is no agent that surpasses the previous performance, branch 815, then the training continues, branch 825, or branch 830 evolution occurs if a predetermined number of training cycles have occurred.

The evolution occurs at multiple levels. There is an agent species level and an individual agent level evolution. The species level corresponds to the phylogenetic evolution of a species, with eliminated agents being replaced by updated agents.

First the agents are sorted by differential fitness, step 835 and their fitness is conditioned with oscillating sigma truncation in the same manner as occurs with the rule-individuals in an agent's population. Then migrant rules are pulled, step 840 from the better performing agents into each agent being evolved.

A group of migrants is obtained for each agent from the other agents at each evolution cycle by choosing an agent to draw from, and choosing a rule within. The choice is performed with fitness-proportional selection. These migrants are integrated into the population of each agent.

New agents are created, step 845 to replace the worst performing agents in each population. A certain percentage of agents in the pool are replaced with completely new agents at each evolution cycle. This helps to ensure that new genetic material is continually being introduced into the environment to help respond to changing situations and to help to increase the system performance.

Then the agents are evolved on a one-by-one basis. This evolution is performed with respect to each job that the agent has learned. New rules that are created for one job cannot write over the rules belonging to another job. The only rules that an evolving job can write over are those rules that have the same job tag or no job tag.

The following comments concerning bidding are exemplary and not limiting. Bids are issued from each rule when it is attempting to satisfy its antecedents and needs to obtain information from a message board. The amount that is bid is a function of the specificity of the antecedent, and the strength of the rule. The impetus to bid is grown into each rule using the genetic programming. As the genetic programming executes, it tests each rule for the possibility of issuing a bid. If the command is in the IA or EA gene graphs (FEHN arrays) for bidding on a message (i.e., checking a message), and the command for placing a message is present in the IC or EC, then the rule will be allowed to survive. Just because the command is present does not mean that it will be executed. Depending on the structure of the program-based antecedent, the program path that contains the message checking command may not execute. In a preferred embodiment, the messages are tested as follows:

1. Ensure that all rules that are deemed valid by the genetic programming actually include the command to check the correct message boards, and to place messages on these boards. If they do not, then these rules suffer early, automatic termination;
2. Check the rules again at run-time, in the learning classifier system epochs. If, during the initial test of the environment, a rule is tested that actually places no bids, then the rule will not be executed. It will be life-taxed out of existence.

As execution proceeds in the learning classifier system epochs, each rule that has a true-valued pair of antecedents may be selected for execution, but it must also perform a bid on IA and EA information. If during the execution of the rule, it is discovered that the antecedents of the rule return a true, but the rule has not checked either the external or internal message board, and won a message then the rule will not be allowed to fire, because the rules will not be placing a bid. These rules do not benefit the learning classifier system society, they just would keep acquiring assets and never pay other rules for information. Thus the learning capabilities of the system would be impaired. Using two-step bidder validation helps to ensure that strength continues to be passed through the system, and evolves rules that do so.

Antecedents can check multiple messages, and consequents can post multiple messages. The bid of a rule that uses multiple messages is applied to each message equally, causing a larger payment. Bidding in an agent is an autonomic process. It occurs automatically during rule execution.

Specificity is a measure of how detailed the antecedent is. Increased specificity is thought to indicate a greater match to the details of the environment, and hence indicates a more appropriate rule. In the disclosed system, the specificity will be given as the FEHN size, as well as being based upon the message detector diffusivity (how wide the message detector is). The FEHN size, which counts the number of non-blank entries in the FEHN array, can serve somewhat as a measure of specificity. Unfortunately, if the antecedent was full of "(not(not(not(not(" type of nodes that take up space but don't do anything, then specificity would not be well indicated by the FEHN size. The number of nodes that are not from the set {NOT, AND, OR, PROGN} would be a better measure of specificity, thus, using $\gamma$ as data in a gene graph:

$$\forall \gamma \ \gamma \notin \{\text{not,and,or,progn}\} \rightarrow \text{UseForSpecificity}(\gamma)$$

Thus the specificity is $4/31 \cong 0.129$.

In practice, this calculation would be performed using the FEHN array, by scanning through it for non-null entries. Null entries in the FEHN array could be either zero, or an integer corresponding to a primitive that is null as defined above {and, or, not progn}.

For a selected rule, the specificity is calculated as the mean of the specificity of the internal antecedent and the external antecedent. With the use of textual words from an ontology, the specificity should also be a function of how deep in the ontology that the word is found.

By way of example and not limitation, the total bid provided by a rule is:

$$\text{Bid}_n(t) = K_R \cdot \{K_B + K_S \cdot S_R\} \cdot U(x,t)$$

where:

$K_R$=bid ratio constant, for example 0.1
$K_B$=base level of bit, constant
$K_S$=specificity based portion of bid, constant
$S_R$=specificity of rule, based on rule analysis
$U(x,t)$=strength of rule x at the start of epoch t Those skilled in the art would understand how values would be selected. The above bid equation requires that three constants be set, and that the sum of $K_B$ and $K_S$ and $K_S \cdot S_R$ could be greater than 1. By making $K_B$ dependent upon the value of $K_S$, then it may be ensured that the sum could never exceed 1. This may be accomplished by making $$K_B = 1 - K_S,$$

so that the bid becomes $$\text{Bid}_n(t) = K_R \cdot \{1 + K_S \cdot S_R - K_S\} \cdot U(x,t).$$

The more specificity is allowed to affect the bid, then the lower the base of the bidding will be. The resulting bid is always less than or equal to $K_R U(x,t)$, so $K_R$ remains the ultimate bid controller. Note that if $S_R$ is 0, the equation becomes:

$$\text{Bid}_n(t)|_{S_R=0} = K_R(1 - K_S)U(x, t)$$

and if $S_R$ goes to 1, the bid equation becomes:

$$\text{Bid}_n(t)|_{S_R=1} = K_R U(x, t)$$

which is the maximum amount that could ever be bid. Thus, the specificity constant $K_S$ controls the effect that specificity has on the bid. If $K_S=0$, then the bid is just $K_R U(x,t)$, otherwise $K_S$ defines the amount of the bid fraction $K_R$ range that will be adjusted based upon specificity.

Figure 20:
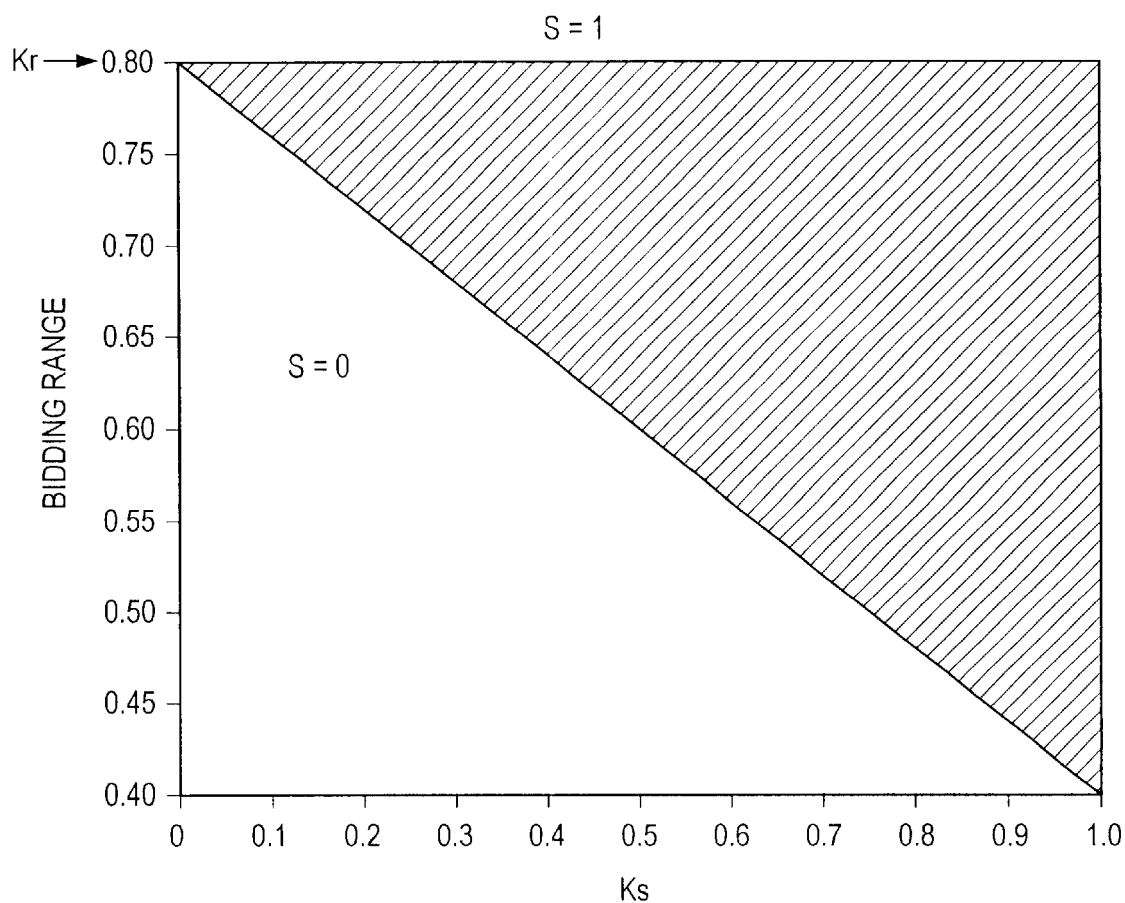
FIG. 20 is a graph illustrating a range of bids for different parameter values.

FIG. 20 illustrates the range of bids possible for different values of $K_S$. In FIG. 20 the range of bidding is illustrated in black for different values of specificity ratio, $K_S$. The overall level of bidding is controlled by the setting of the bid ratio constant, $K_R$. The range is bordered by the lines for specificity S=0 and S=1.

The actual bid that is accepted by the message for consideration is modified from the strictly deterministic bid received from the individual rules. This allows greater exploration of the environment. The auction is held in the presence of random noise. Thus, the effective bid is:

$$\text{Bid}E_n(t)=\text{Bid}_n(t)+N(\sigma_{bid})$$

where $N(\sigma_{bid})$=a Gaussian (normally) distributed random number having a standard deviation of $\sigma_{bid}$.

To adapt to changing levels of U, or wallet fitness in the individuals, the Gaussian noise has been incorporated into the bid calculation, and thus is adapted by way of the strength of the rule. Thus the degree of noise that a strong rule might use would be greater than that of a weak rule. This excludes a circumstance where the amount of noise used by a weak rule could amount to more than its available cash, or even turn the bid into a negative number. The bid equation thus becomes:

$$\text{Bid}_n(t)=K_R\cdot\{1+K_S\cdot S_R-K_S+N(\sigma_{bid})\}\cdot U(x,t).$$

To provide bid noise control, and interface with a preferred Gaussian random noise (number) generator, such as available in Java, which creates noise having a standard deviation of 1, a bid noise constant has been added, resulting in a noise equation of $$\frac{N(1)}{K_N},$$

where $K_n$ would be set to 100 for a standard deviation of noise to be 1/100 of the bid.

When using fuzzy messages, the range of the message detectors in the antecedents provides another vehicle to adjust bidding amounts based upon specificity. The fuzzy messages have a range of acceptability between midl and midh, which are portions of a range of message numbers between a floor and a ceiling. A specificity calculation that is possible with this information is:

$$S_{M,n} = 1 - \frac{midh - midl}{ceiling - floor}$$

where $S_{M,n}$ is the specificity for messages, and n is the message index in the rule. $S_{M,n}$ starts at zero for messages that encompass the entire ceiling-to-floor range, and grows to one for a message range that has zero width. Nonlinear message specificity can be used by raising $S_{M,n}$ to a power; less than one to favor wider ranges, greater than one to favor smaller ranges.

The bidding equation can be rewritten as:

$$Bid_n(t) = K_R \cdot \left\{1 - K_S(1 - S_R) + \frac{N(1)}{K_N}\right\} \cdot U(x, t)$$

and substitution of the combined specificity, including both structural $S_R$ and mechanical $S_{M,n}$ specificity in a mean specificity equation, yields.

$$bid = K_R\left\{1 - K_s\left[1 - \frac{\left(S_R + \frac{1}{N}\sum_{n=0}^{N-1} S_{M,n}\right)}{2}\right] + \frac{N(1)}{K_n}\right\}U$$

where:
$K_R$=overall bidding rate, like 0.1 of the remaining funds, range [0,1]

$K_S$=specificity level, such as 0.25, range [0,1], a higher value corresponds to using more specificity $S_R$=specificity calculated from the rule, using the antecedent structure, range [0,1]

$S_{M,n}$=specificity calculated for each fuzzy message in the antecedent of the rule, range [0,1]

N=number of messages in a rule's antecedent

N(1)=Gaussian-distributed random variable, with standard deviation=1, as found in Java $K_N$=bid noise constant. Set to 100 for standard deviation of noise to be 1/100 of bid U=strength of rule This equation is of the form bid=$K_R f$(specificity)U, where the function of specificity in the equation results in a number in the range of [0,1]. The average of all the specificities is calculated, and is weighted by $K_S$. Also, Gaussian noise of zero mean, having a standard deviation of $1/K_N$ is added for noisy bidding. All these constants are set in the Agent genetic programming parameters code. Initial values for each of the constants are illustrated in the equation above.

Specificity of run n at time (epoch) t is calculated as:

$$S_R = \frac{\sum_{m=0}^{M} nonNullNode(m)}{M}$$

$nonNullNode(m) =$ $$\begin{cases} 1, \text{node } m \text{ in } FEHN \text{ array has data } \gamma \notin \{and, or, not, prog\} \\ 0, \text{node } m \text{ in } FEHN \text{ array is empty or} \\ \phantom{0,} \text{has data } \gamma \notin \{and, or, not, prog\} \end{cases}$$

where
M=number of nodes in FEHN array
γ=data in a gene graph, can be a function or a terminal.

There is an internal and an external specificity, depending on whether the Internal or the External Antecedent is being analyzed. Specificity is calculated when the rule is created. An example of a specificity calculation follows. For example, if an external antecedent has the following program: (And(Or(AgentPresentINFO)(Not1))(And(and1 1)(AgentPresentINVENTORY)))

This program was created in an environment that creates programs having a maximum depth of 5 and a maximum fan-in of 2. As a result, there may be at most 31 nodes in the system, thus M=31. The number of non-null nodes in the program is illustrated in the following table:

| Primitive | non-null = 1 |
|---|---|
| And | 0 |
| Or | 0 |
| AgentPresent | 1 |
| INFO | 1 |
| Not | 0 |
| 1 | 0 |
| And | 0 |
| And | 0 |
| 1 | 0 |
| 1 | 0 |
| AgentPresent | 1 |
| INVENTORY | 1 |
| total: | 4 |

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. An adaptive system comprising:

a plurality of agents wherein at least some of the agents exhibit a substantially similar structure with a selected function defined, at least in part, by a plurality of pre-stored rules and wherein each of the rules includes one or more antecedent conditions automatically selected from a class which includes external messages, agent characteristics, environmental detecting primitives, internal messages and internal state-detecting primitives and each includes a variable performance indicium with respective indicia being selectively altered in response to increased effectiveness in carrying out the selected function.

2. An adaptive system as in claim 1 wherein each rule includes one or more consequent actions selected automatically from a class which includes external messages, environmental altering primitives, internal messages and internal state changing primitives.

3. A system as in claim 2 wherein at least some of the agents each include a rule modification system.

4. A system as in claim 3 wherein the respective pluralities of rules include relatively newly created, evolving rules and imported rules received from a different agent.

5. A system as in claim 4 wherein members of a selected plurality of rules attempt to acquire intra-agent messages from a local plurality by successfully bidding therefore.

6. A system as in claim 2 wherein at least some of the agents each include an indicium indicative of the respective agent's overall performance.

7. A system as in claim 2 wherein some of the agents reside at different sites than others and wherein agents can be transmitted between sites via an interconnecting network.

8. A system as in claim 7 wherein multiple agents can be resident at a selected site.

9. A system as in claim 8 wherein at least some of the agents communicate with respective, locally resident application software.

10. A system as in claim 9 wherein agents are coupled to selected respective pluralities of messages.

11. A system as in claim 10 wherein a plurality of agents can forward messages to and receive messages from a selected collection of messages.

12. A system as in claim 11 wherein the collection of messages maintains a running indicium, which is altered when messages are acquired by a selected agent and altered in a different way when acquired messages are received from other agents.

13. A system as in claim 2 wherein at least some of the agents are implemented in software executable at an associated processor and wherein at least some of such agents include software for creating new rules based, in part, on existing rules.

14. A system as in claim 13 wherein such agents also include software for evaluating rule performance and for replacing at least one rule with a new rule in accordance with a determined criterion.

15. A system as in claim 14 wherein the evaluating software replaces rules in a manner that promotes diversity.

16. A system as in claim 1 which includes at least one simulator for training at least one of the agents.

17. An adaptive system comprising:

a plurality of agents wherein at least some of the agents exhibit a substantially similar structure with a selected function defined, at least in part, by a plurality of pre-stored rules and wherein each of the rules includes a variable performance indicium with a greater indicium being indicative of increased effectiveness of carrying out the selected function; and a collection of interagent messages wherein agents can forward messages to and receive messages from the collection.

18. A system as in claim 17 wherein at least some of the agents each include a rule modification system.

19. A system as in claim 18 wherein the respective pluralities of rules include relatively newly created, evolving rules and imported rules received from a different agent.

20. A system as in claim 17 wherein at least some of the agents each include a total performance indicium indicative of the respective agent's overall performance.

21. A system as in claim 17 wherein some of the agents reside at different sites than others and wherein agents can be transmitted between sites via an interconnecting network.

22. A system as in claim 21 wherein multiple agents can be resident at a selected site.

23. A system as in claim 22 wherein agents communicate with locally resident application software.

24. A system as in claim 23 wherein agents are coupled to selected respective pluralities of messages; and wherein agents can forward messages to and receive messages from a selected plurality of agents.

25. A system as in claim 17 wherein members of a selected plurality of rules attempt to acquire intra-agent messages from a local plurality by successfully bidding therefore.

26. A system as in claim 17 wherein at least some of the rules each have an antecedent and a consequence which follows only if the requirements of the antecedent have been met.

27. A system as in claim 17 wherein at least some of the rules include one or more antecedent conditions automatically selected from a class which includes external messages, agent characteristics, environmental detecting primitives, internal messages and internal state-detecting primitives and each includes a variable performance indicium with respective indicia being selectively altered in response to increased effectives in carrying out the selected function.

28. An adaptive system as in claim 17 wherein each rule includes one or more consequent actions selected automatically from a class which includes external messages, environmental altering primitives, internal messages and internal state changing primitives.

29. A system, implemented as a set of programs, some of which can be transferred via a medium between sites of a network, comprising:

a plurality of diverse agents for implementing at least two different processes wherein the respective agents include a plurality of rules with each rule having at least one antecedent and at least one consequent; and an evaluator wherein a selected agent is not activated unless specified antecedents are met and unless the selected agent has met a predetermined performance criterion.

30. A system as in claim 29 which includes at least one agent training simulator.

31. A system as in claim 30 wherein at least some of the agents are implemented as a processing portion and an interface portion.

32. A system as in claim 31 wherein the processing portion is linked to the simulator for training.

33. A system as in claim 29 wherein at least some of the agents include a state machine for evaluating antecedents.

34. A multiple site system comprising:
a diverse group of entities wherein each of the entities incorporates a plurality of rules, wherein each rule has associated therewith an effectiveness indicium, and wherein the rules are implemented in at least a two-part, variable condition format; and
an information compilation having discrete information segments, wherein segments can be received from various of the entities and added to the compilation and including executable instructions for auctioning at least some of the segments to members of the entity population wherein entities acquire auctioned segments in exchange for value indicating indicia and including software for transferring at least a portion of the indicia received for a segment to the entity contributing that segment.

35. A system as in claim 34 which includes a simulator for automatically training at least some of the entities.

36. A system as in claim 34 wherein the entities are located at and p executed on a plurality of spaced apart processors on a network.

37. A system as in claim 36 which includes executable instructions for transferring entities between different processors.

38. A virtual society comprising:
a plurality of diverse, software implemented agents each of which maintains a variable effectiveness indicium; and
a software implemented message collection wherein agents contribute messages and wherein messages are allocated to respective agents in response to each respective agent satisfying an indicium based criterion and wherein message contributing agents are rewarded for an allocated message.

39. A society as in claim 38 wherein each of the agents includes a plurality of software based, multi-part, function implementing rules.

40. A society as in claim 39 which includes a software reproduction process wherein an offspring rule is created from at least one selected rule in accordance with a predetermined criterion.

41. A society as in claim 40 wherein agents include software wherein an existing rule of an agent is replaced by an offspring rule in accordance with a predetermined criterion to promote improved effectiveness of the respective agent as measured by a selected criterion.

42. A society as in claim 41 wherein agents include software which promotes diversity among rules.

43. A society as in claim 42 wherein the diversity software includes array processing for evaluating structural similarities between two different rules.

44. A society as in claim 42 wherein the diversity software includes oscillating sigma truncation.

45. A society as in claim 39 which includes software for covering messages which were not allocated from the message collection.

46. A society as in claim 39 which includes software for creating new rules which incorporate new information from an external environment.

47. A society as in claim 38 wherein agents are displaced from one another at different sites on a network and wherein at least one of the sites includes software for transmitting an agent to a different site for execution thereat.

48. A society as in claim 38 which includes a plurality of networked processors, wherein, some of the agents reside at different processors and wherein agents contribute messages to and receive messages from message collections implemented at different, interconnected processors.

49. An adaptive system comprising:
a plurality of agents wherein at least some of the agents exhibit a substantially similar structure with a selected function defined, at least in part, by a plurality of pre-stored rules and wherein each of the rules includes a variable performance indicium with respective indicia being selectively altered in response to increased effectiveness in carrying out the selected function, and executable instructions for automatically created new rules.

50. A system as in claim 49 wherein the respective pluralities of rules include evolving rules and imported rules received from a different agent.

51. A system as in claim 49 wherein agents are coupled to selected respective pluralities of messages.

52. A system as in claim 51 wherein a plurality of agents can forward messages to and receive messages from a selected collection of messages.

53. A system as in claim 52 wherein the collection of messages maintains a running indicium which is altered when messages are acquired by a selected agent and altered in a different way when acquired messages are received from other agents.

54. A system as in claim 53 wherein agents also include software for evaluating rule performance and for replacing at least one rule with a new rule in accordance with a redetermined criterion.

55. A system as in claim 54 wherein the evaluating software replaces rules so as to promote diversity.

56. An adaptive system comprising:
a plurality of agents wherein at least some of the agents exhibit a substantially similar structure with a selected function defined, at least in part, by a plurality of pre-stored rules and wherein at least some of the rules have a non-string like antecedent/consequent structure; and
including software for automatically creating at least some of the rules.

57. A system as in claim 56 which includes software for receiving and evaluating bids from rules for messages.

58. A system as in claim 57 wherein the respective pluralities of rules include relatively newly created, evolving rules and imported rules received from a different agent.

59. A system as in claim 57 wherein agents are coupled to selected respective pluralities of messages.

60. A system as in claim 59 wherein a plurality of agents can forward messages to and receive messages from a selected collection of messages.

61. A system as in claim 60 wherein the collection of messages maintains a running indicium, which is altered when messages are acquired by a selected agent and altered in a different way when acquired messages are received from other agents.

62. A system as in claim 56 wherein at least some of the agents each include an indicium indicative of the respective ages overall performance.

63. A system as in claim 56 wherein members of a selected plurality of rules attempt to acquire intra-agent messages from a local plurality by successfully bidding therefore.

64. A system as in claim 56 wherein such agents also include software for evaluating rule performance and for replacing at least one rule with a new rule in accordance with a determined criterion.

65. A system as in claim 64 wherein the evaluating software replaces rules in a manner that promotes diversity.

66. A system as in claim 56 wherein at least some of the rules each include a variable performance indicium with the indicia being selectively altered in response to increased performance in carrying out the selected function.

67. A method comprising:

providing a plurality of multi-part rules, each having an antecedent portion and a consequent portion;

matching requirements of at least one antecedent portion of a selected rule prior to permitting the rule to carry out the consequent portion where matching includes attempting to acquire at least one of an external message from an external message list and an internal message from an internal message list in response to an indicium of a selected message falling within a predetermined range;

responsive to the results of the matching, carrying out the consequent portion.

68. A method as in claim 67 which includes, carrying out the consequent portion by posting at least one consequent message for use by other rules.

69. A method as in claim 68 which includes providing a reward to at least one rule that has been able to execute its consequent portion.

70. A method as in claim 67 which includes matching antecedent requirements of a plurality of rules by comparing an indicium of a selected available message to an acceptability range of the respective rule.

71. A method as in claim 70 which includes permitting those rules that have fulfilled their antecedent requirements to try to execute their consequent portions.

72. A method as in claim 71 which includes permitting those rules that successfully executed their consequent portions to make messages available for acquisition by other rules.

73. A method as in claim 67 which includes promoting diversity among newly created rules.

74. A method as in claim 73 which includes evaluating effectiveness of a plurality of rules and modulating an effectiveness indicium so as to promote diversity of rules.

75. A method as in claim 67 where a rule acquires a message by offering resources in a bidding process.

76. A method as in claim 75 where a rule acquires a plurality of messages in satisfying its antecedent portion.

77. A method as in claim 76 where messages are acquired by bidding against other rules.

78. Software recorded on a computer readable medium comprising:

first software for maintenance of a plurality of agents;

second software for attempting to carry out a plurality of agent related multi-part rules, second software including additional software to evaluate a first part of the rules by evaluating if an indicium of a message, sought by a respective rule, falls into a predetermined rule related range;

third software for automatically generating additional rules where diversity is promoted among the additional rules.

79. Software as in claim 78 which includes software enabling a respective rule to bid against other rules for a selected message.

80. Software as in claim 79 including additional software enabling agents to move between sites of a computer based network.

81. Software as in claim 79 which includes additional software for evaluating a second part of a respective rule, responsive to successfully evaluating a first part of that rule where evaluating the first part has led to at least one message related bid.

* * * * *